US010568093B2

(12) United States Patent
Yerramalli et al.

(10) Patent No.: US 10,568,093 B2
(45) Date of Patent: Feb. 18, 2020

(54) PERIODIC AND APERIODIC CSI REPORTING PROCEDURES FOR ENHANCED LICENSED ASSISTED ACCESS

(71) Applicant: QUALCOMM Incorporated, San Diego, CA (US)

(72) Inventors: Srinivas Yerramalli, San Diego, CA (US); Wanshi Chen, San Diego, CA (US); Peter Gaal, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/986,758

(22) Filed: May 22, 2018

(65) Prior Publication Data

US 2018/0270818 A1 Sep. 20, 2018

Related U.S. Application Data

(62) Division of application No. 15/461,280, filed on Mar. 16, 2017, now Pat. No. 10,178,668.

(Continued)

(51) Int. Cl.
*H04W 4/00* (2018.01)
*H04W 72/04* (2009.01)
(Continued)

(52) U.S. Cl.
CPC ....... *H04W 72/0446* (2013.01); *H04L 1/1861* (2013.01); *H04L 5/0057* (2013.01);
(Continued)

(58) Field of Classification Search
None
See application file for complete search history.

(56) References Cited

U.S. PATENT DOCUMENTS 9,590,878 B2 3/2017 Xu et al.
2009/0175232 A1 7/2009 Kolding
(Continued)

FOREIGN PATENT DOCUMENTS

CN 104885548 A 9/2015
CN 105706481 A 6/2016
(Continued)

OTHER PUBLICATIONS

International Search Report and Written Opinion—PCT/US2017/034559—ISA/EPO—dated Nov. 6, 2017.
(Continued)

*Primary Examiner* — Elisabeth Benoit Magloire
(74) *Attorney, Agent, or Firm* — Nerrie M. Zohn

(57) ABSTRACT

In enhanced licensed assisted access (eLAA), providing several approaches to report the channel state information (CSI) measurement may be desirable to provide flexibility in CSI reporting, especially in aperiodic CSI reporting. Further, a difference in using a licensed carrier and an unlicensed carrier may be considered during communication. In addition, assigning different transmit power usage based on different transmission types may be desired. The apparatus may be a user equipment (UE). The apparatus may be a UE. The UE receives a grant for uplink communication. The UE determines a reporting subframe based on the grant. The UE determines whether to select, as a reference subframe, a triggering subframe in which the grant is received or a subframe before the reporting subframe. The UE transmits, in the reporting subframe, CSI measured in the reference subframe.

16 Claims, 13 Drawing Sheets

Related U.S. Application Data

(60) Provisional application No. 62/372,264, filed on Aug. 8, 2016.

(51) Int. Cl.
*H04W 72/02* (2009.01)
*H04L 1/18* (2006.01)
*H04L 5/00* (2006.01)
*H04W 16/14* (2009.01)

(52) U.S. Cl.
CPC ........... *H04W 16/14* (2013.01); *H04W 72/02* (2013.01); *H04W 72/042* (2013.01)

(56) References Cited

U.S. PATENT DOCUMENTS

| | | |
|---|---|---|
| 2014/0177487 A1 | 6/2014 | Hammarwall et al. |
| 2014/0328260 A1 | 11/2014 | Papasakellariou et al. |
| 2015/0264662 A1 | 9/2015 | Sahlin et al. |
| 2015/0305058 A1 | 10/2015 | Hammarwall et al. |
| 2015/0319753 A1* | 11/2015 | Chen ................... H04L 5/001 370/277 |
| 2015/0358134 A1 | 12/2015 | Hammarwall et al. |
| 2015/0365152 A1 | 12/2015 | Frenne et al. |
| 2016/0007350 A1* | 1/2016 | Xiong ................... H04W 24/10 370/252 |
| 2016/0044617 A1* | 2/2016 | Vajapeyam ........ H04W 56/0005 370/336 |
| 2016/0095048 A1 | 3/2016 | Nory et al. |
| 2016/0100407 A1* | 4/2016 | Gaal ................. H04W 72/0453 370/329 |
| 2016/0142191 A1* | 5/2016 | Davydov .............. H04L 1/0026 370/329 |
| 2016/0197687 A1 | 7/2016 | Song et al. |
| 2016/0205579 A1 | 7/2016 | Cheng et al. |
| 2016/0205679 A1 | 7/2016 | Yoo et al. |
| 2016/0226629 A1 | 8/2016 | Liu et al. |
| 2016/0227428 A1 | 8/2016 | Novlan et al. |
| 2016/0227548 A1 | 8/2016 | Nimbalker et al. |
| 2016/0302183 A1 | 10/2016 | Yang et al. |
| 2016/0353415 A1 | 12/2016 | Sarkar et al. |
| 2017/0063479 A1 | 3/2017 | Kim et al. |
| 2017/0078071 A1 | 3/2017 | Pan et al. |
| 2017/0251442 A1 | 8/2017 | Kalhan et al. |
| 2017/0311311 A1 | 10/2017 | Frenne et al. |
| 2017/0331602 A1 | 11/2017 | Hugl et al. |
| 2017/0359746 A1 | 12/2017 | Lee et al. |
| 2017/0373792 A1 | 12/2017 | Lunttila et al. |
| 2018/0014219 A1 | 1/2018 | Takeda et al. |
| 2018/0019855 A1 | 1/2018 | Zhang et al. |
| 2018/0027549 A1* | 1/2018 | Wang ................... H04L 5/0057 370/329 |
| 2018/0034526 A1* | 2/2018 | Lee ....................... H04W 24/10 |
| 2018/0042012 A1 | 2/2018 | Yerramalli et al. |
| 2018/0048498 A1 | 2/2018 | Stern et al. |
| 2018/0083684 A1* | 3/2018 | He ....................... H04B 7/0626 |
| 2018/0084540 A1* | 3/2018 | Takeda ................. H04L 5/0044 |
| 2018/0092050 A1 | 3/2018 | Gu et al. |
| 2018/0139639 A1* | 5/2018 | Aiba ................... H04W 72/042 |
| 2018/0199369 A1 | 7/2018 | Larsson et al. |
| 2018/0206129 A1 | 7/2018 | Choi et al. |
| 2018/0212740 A1 | 7/2018 | Bhorkar et al. |
| 2018/0262377 A1* | 9/2018 | Liu ....................... H04L 1/0026 |
| 2018/0270819 A1 | 9/2018 | Yerramalli et al. |
| 2018/0337752 A1* | 11/2018 | Choi ...................... H04B 7/26 |
| 2019/0098628 A1 | 3/2019 | Yerramalli et al. |

FOREIGN PATENT DOCUMENTS

| | | |
|---|---|---|
| EP | 2995020 A1 | 3/2016 |
| JP | 2015512571 A | 4/2015 |
| JP | 2016518045 A | 6/2016 |
| WO | 2014113243 A2 | 7/2014 |
| WO | 2016061382 A1 | 4/2016 |
| WO | 2016123402 A1 | 8/2016 |

OTHER PUBLICATIONS

Partial International Search Report—PCT/US2017/034559—ISA/EPO—dated Sep. 12, 2017.
Potevio: "Discussion on Aperiodic CSI Feedback for eiMTA", 3GPP TSG RAN WG1 Meeting #76, R1-140430, Feb. 9, 2014, XP050735969, Retrieved from the Internet: URL:http://www.3gpp.org/ftp/Meetings_3GPP_SYNC/RAN/RAN1/Docs/, 4 pages.
ZTE: "Discussion on UCI Transmission on an LAA SCell", 3GPP Draft; R1-164598, 3rd Generation Partnership Project (3GPP), Mobile Competence Centre; 650, Route Des Lucioles; F-06921 Sophia-Antipolis Cedex; FR, vol. RAN WG1, No. Nanjing, China; May 13, 2016, XP051096887, Retrieved from he Internet: URL:http://www.3gpp.org/ftp/tsg_ran/WG1_RL1/TSGR1_85/Docs/ [retrieved on May 13, 2016], 4 pages.
3GPP: "3rd Generation Partnership Project, Technical Specification Group Radio Access Network; Evolved Universal Terrestrial Radio Access (E-UTRA); Physical layer procedures(Release 13)", 3GPP TS 36.213 V13.2.0, Jun. 30, 2016, pp. 45-254, http://www.3gpp.org/ftp/Specs/archive/36_series/36.213/36213-d20.zip.
Huawei, "PHY Signaling Design for eLAA", 3GPP TSG RAN WG1 Meeting #85, R1-164829, May 14, 2016, 5 pages, http://www.3gpp.org/ftp/tsg_ran/WG1_RL1/TSGR1_85/Docs/R1-164829.zip.
Intel Corporation., "On the DCI Design for Multi-Subframe Scheduling", 3GPP TSG RAN WG1 Meeting #85, R1-164127, May 14, 2016, 5 pages, http://www.3gpp.org/ftp/tsg_ran/WG1_RL1/TSGR1_85/Docs/R1-164127.zip.
Taiwan Search Report—TW106117548—TIPO—Oct. 3, 2019.

* cited by examiner

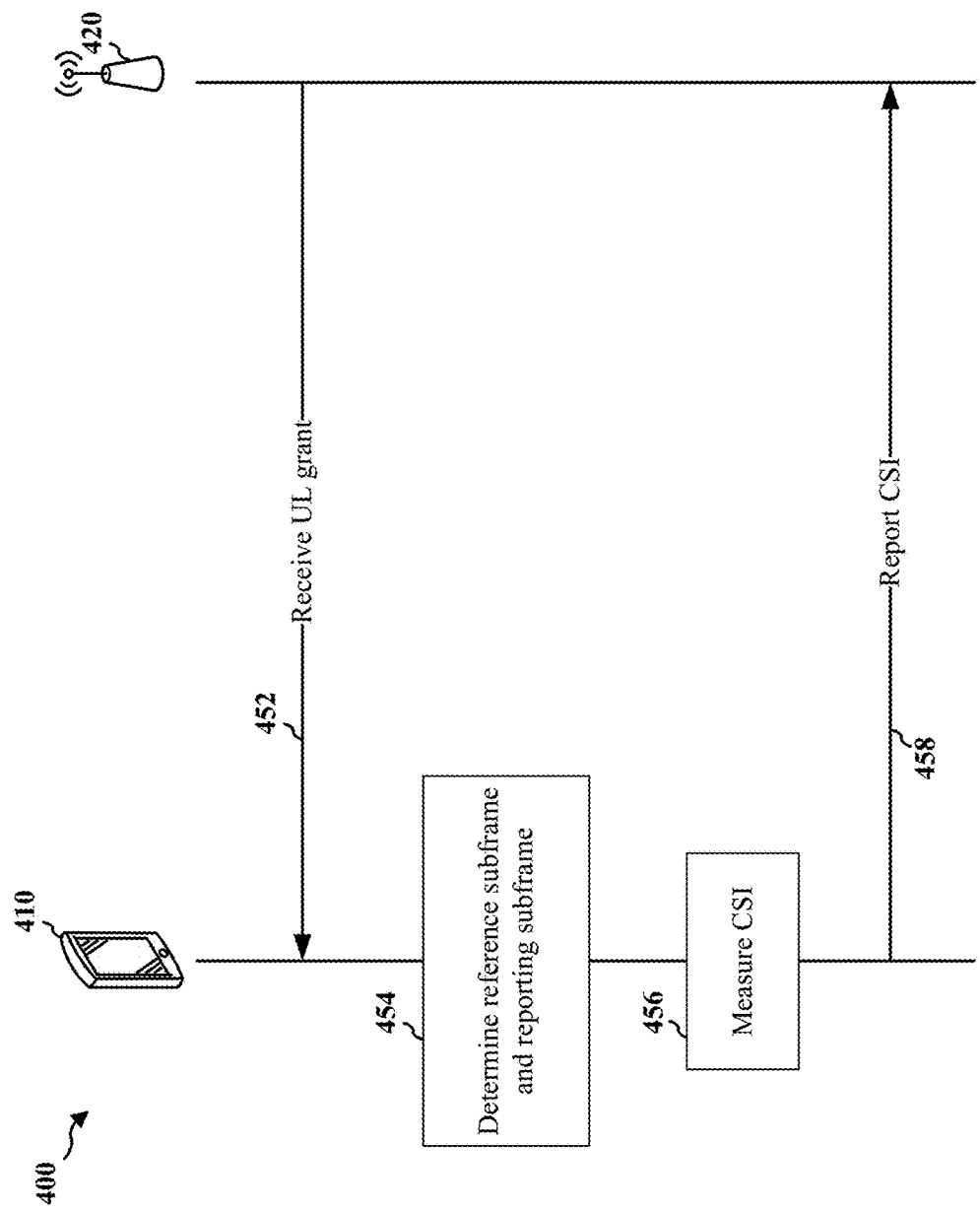

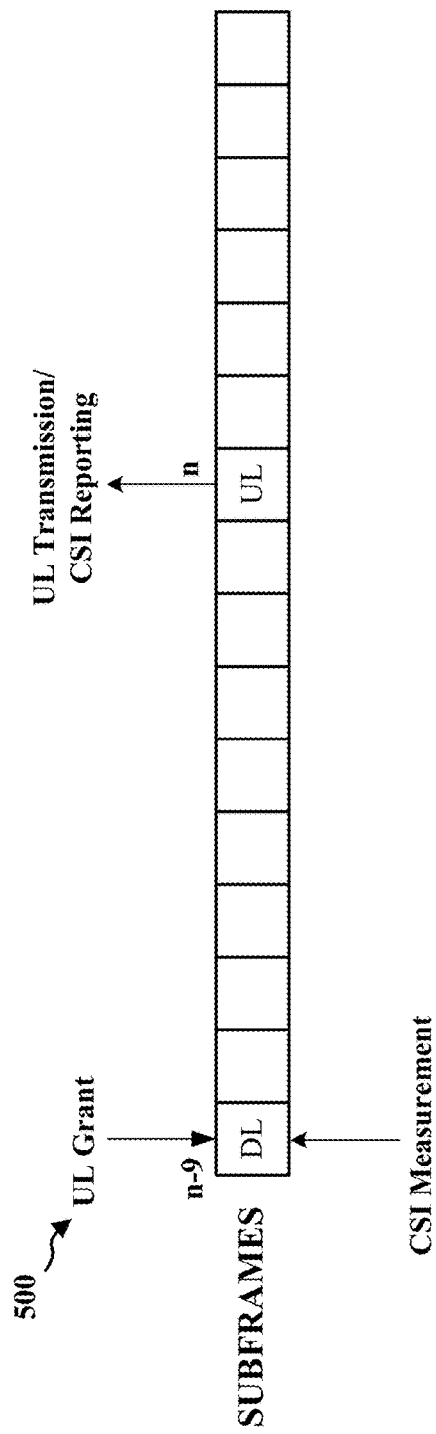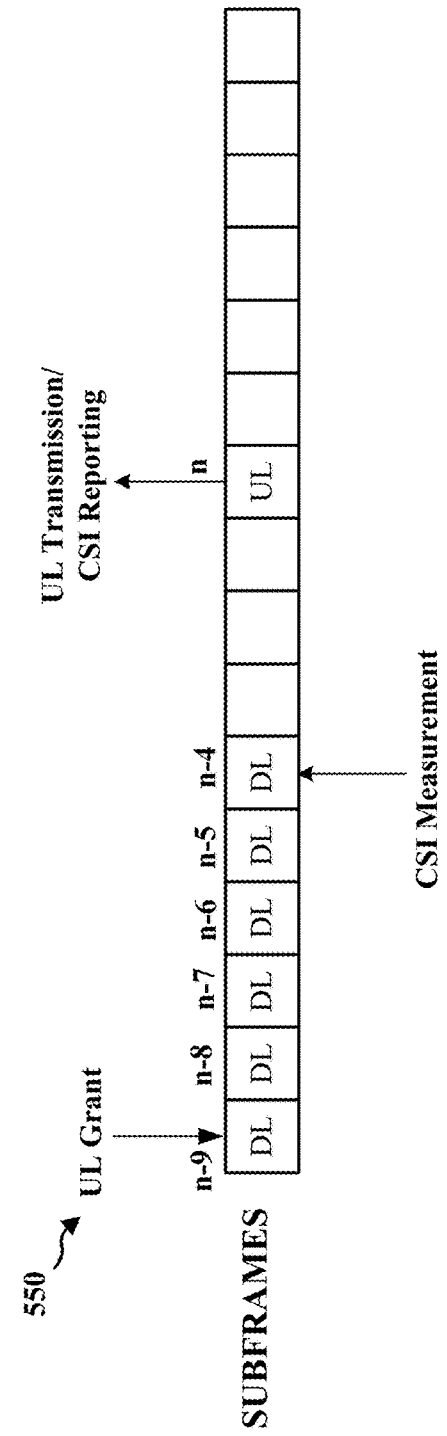
FIG. 5A
FIG. 5B

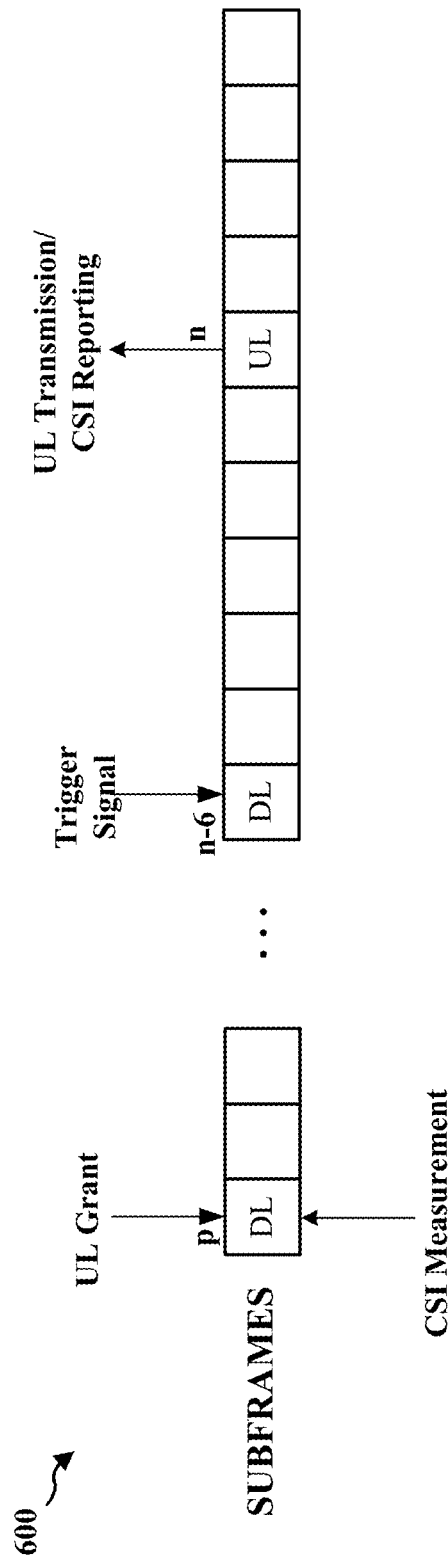
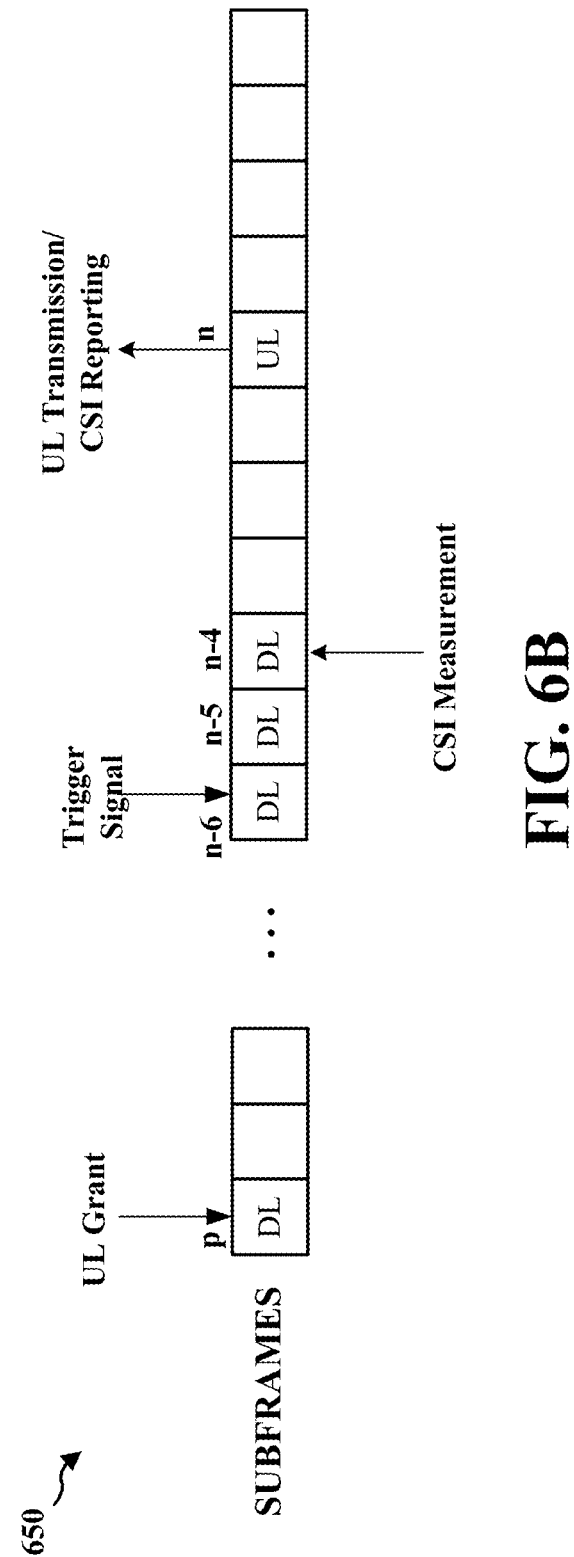
FIG. 6A
FIG. 6B

PERIODIC AND APERIODIC CSI REPORTING PROCEDURES FOR ENHANCED LICENSED ASSISTED ACCESS

CROSS-REFERENCE TO RELATED APPLICATION(S)

This application is a divisional of U.S. application Ser. No. 15/461,280, entitled "PERIODIC AND APERIODIC CSI REPORTING PROCEDURES FOR ENHANCED LICENSED ASSISTED ACCESS" and filed on Mar. 16, 2017, which claims the benefit of U.S. Provisional Application Ser. No. 62/372,264, entitled "PERIODIC AND APERIODIC CSI REPORTING PROCEDURES FOR ENHANCED LICENSED ASSISTED ACCESS" and filed on Aug. 8, 2016, the entire contents of both of which are expressly incorporated by reference herein in its entirety.

BACKGROUND

Field

The present disclosure relates generally to communication systems, and more particularly, to measurement and reporting of channel quality, and power control for transmitting channel quality reports.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In enhanced licensed assisted access (eLAA), measuring and reporting of channel state information (CSI) may be based on an uplink grant and other signaling. A user equipment (UE) may report the measured CSI via periodic CSI reporting and/or aperiodic CSI reporting. Providing several approaches to report the CSI measurement may be desirable to provide flexibility in CSI reporting, especially in aperiodic CSI reporting. Further, a difference in using a licensed carrier and an unlicensed carrier may be considered during communication. In addition, different transmissions may be assigned with different priorities to scale UE transmit power usage.

In an aspect of the disclosure, a method, a computer-readable medium, and an apparatus are provided. The apparatus may be a UE for wireless communication in a shared spectrum. The UE receives a grant for uplink communication. The UE determines a reporting subframe based on the grant. The UE determines whether to select, as a reference subframe, a triggering subframe in which the grant is received or a subframe before the reporting subframe. The UE transmits, in the reporting subframe, CSI measured in the reference subframe.

In an aspect, the apparatus may be a UE for wireless communication in a shared spectrum. The UE may include means for receiving a grant for uplink communication. The UE may include means for determining a reporting subframe based on the grant. The UE may include means for determining whether to select, as a reference subframe, a triggering subframe in which the grant is received or a subframe before the reporting subframe. The UE may include means for transmitting, in the reporting subframe, CSI measured in the reference subframe.

In an aspect, the apparatus may be a UE for wireless communication in a shared spectrum, where the UE may include a memory and at least one processor coupled to the memory. The at least one processor may be configured to: receive a grant for uplink communication, determine a reporting subframe based on the grant, determine whether to select, as a reference subframe, a triggering subframe in which the grant is received or a subframe before the reporting subframe, and transmit, in the reporting subframe, CSI measured in the reference subframe.

In an aspect, a computer-readable medium storing computer executable code for a UE for wireless communication in a shared spectrum may include code to: receive a grant for uplink communication, determine a reporting subframe based on the grant, determine whether to select, as a reference subframe, a triggering subframe in which the grant is received or a subframe before the reporting subframe, and transmit, in the reporting subframe, CSI measured in the reference subframe.

In another aspect of the disclosure, a method, a computer-readable medium, and an apparatus are provided. The apparatus may be a UE for wireless communication in a shared spectrum. The UE determines a cell group, the cell group including at least one licensed carrier configured with an uplink control channel and one or more unlicensed carriers. The UE reports at least one of a hybrid automatic repeat request (HARQ) acknowledgement/negative-acknowledgement (ACK/NACK) or periodic CSI for the cell group on the at least one licensed carrier provided by the cell group.

In an aspect, the apparatus may be a UE for wireless communication in a shared spectrum. The UE may include means for determining a cell group, the cell group including at least one licensed carrier configured with an uplink control channel and one or more unlicensed carriers. The UE may include means for reporting at least one of a HARQ ACK/NACK or periodic CSI for the cell group on the at least one licensed carrier provided by the cell group.

In an aspect, the apparatus may be a UE for wireless communication in a shared spectrum, where the UE may include a memory and at least one processor coupled to the memory. The at least one processor may be configured to: determine a cell group, the cell group including at least one licensed carrier configured with an uplink control channel and one or more unlicensed carriers, and report at least one of a HARQ ACK/NACK or periodic CSI for the cell group on the at least one licensed carrier provided by the cell group.

In an aspect, a computer-readable medium storing computer executable code for a UE for wireless communication in a shared spectrum may include code to: determine a cell group, the cell group including at least one licensed carrier configured with an uplink control channel and one or more unlicensed carriers, and report at least one of a HARQ ACK/NACK or periodic CSI for the cell group on the at least one licensed carrier provided by the cell group.

In another aspect of the disclosure, a method, a computer-readable medium, and an apparatus are provided. The apparatus may be a UE for wireless communication in a shared spectrum. The UE determines a first cell group including one or more licensed carriers. The UE determines a second cell group including one of more unlicensed carriers. The UE receives a CSI trigger. The UE transmits the CSI on a licensed carrier in the first cell group if the CSI trigger was received on a first carrier in the first cell group. The UE transmits the CSI on an unlicensed carrier in the second cell group if the CSI trigger was received on a second carrier in the second cell group.

In an aspect, the apparatus may be a UE for wireless communication in a shared spectrum. The UE may include means for determining a first cell group including one or more licensed carriers. The UE may include means for determining a second cell group including one of more unlicensed carriers. The UE may include receiving a CSI trigger. The UE may include means for transmitting the CSI on a licensed carrier in the first cell group if the CSI trigger was received on a first carrier in the first cell group. The UE may include means for transmitting the CSI on an unlicensed carrier in the second cell group if the CSI trigger was received on a second carrier in the second cell group.

In an aspect, the apparatus may be a UE for wireless communication in a shared spectrum, where the UE may include a memory and at least one processor coupled to the memory. The at least one processor may be configured to: determine a first cell group including one or more licensed carriers, determine a second cell group including one of more unlicensed carriers, receive a CSI trigger, transmit the CSI on a licensed carrier in the first cell group if the CSI trigger was received on a first carrier in the first cell group, and transmit the CSI on an unlicensed carrier in the second cell group if the CSI trigger was received on a second carrier in the second cell group.

In an aspect, a computer-readable medium storing computer executable code for a UE for wireless communication in a shared spectrum may include code to: determine a first cell group including one or more licensed carriers, determine a second cell group including one of more unlicensed carriers, receive a CSI trigger, transmit the CSI on a licensed carrier in the first cell group if the CSI trigger was received on a first carrier in the first cell group, and transmit the CSI on an unlicensed carrier in the second cell group if the CSI trigger was received on a second carrier in the second cell group.

In another aspect of the disclosure, a method, a computer-readable medium, and an apparatus are provided. The apparatus may be a UE for wireless communication in a shared spectrum. The UE allocates a first portion of a total transmit power to transmission of an uplink control information to a licensed serving cell via an uplink channel on a licensed carrier. The UE allocates a second portion of the total transmit power to transmission of an aperiodic CSI on an unlicensed carrier to an unlicensed cell, where the second portion is less than or equal to remaining portion of the total transmit power after allocating the first portion to the uplink channel.

In an aspect, the apparatus may be a UE for wireless communication in a shared spectrum. The UE may include means for allocating a first portion of a total transmit power to transmission of an uplink control information to a licensed serving cell via an uplink channel on a licensed carrier. The UE may include means for allocating a second portion of the total transmit power to transmission of an aperiodic CSI on an unlicensed carrier to an unlicensed cell, where the second portion is less than or equal to remaining portion of the total transmit power after allocating the first portion to the uplink channel.

In an aspect, the apparatus may be a UE for wireless communication in a shared spectrum, where the UE may include a memory and at least one processor coupled to the memory. The at least one processor may be configured to: allocate a first portion of a total transmit power to transmission of an uplink control information to a licensed serving cell via an uplink channel on a licensed carrier, and allocate a second portion of the total transmit power to transmission of an aperiodic CSI on an unlicensed carrier to an unlicensed cell, where the second portion is less than or equal to remaining portion of the total transmit power after allocating the first portion to the uplink channel.

In an aspect, a computer-readable medium storing computer executable code for a UE for wireless communication in a shared spectrum may include code to: allocate a first portion of a total transmit power to transmission of an uplink control information to a licensed serving cell via an uplink channel on a licensed carrier, and allocate a second portion of the total transmit power to transmission of an aperiodic CSI on an unlicensed carrier to an unlicensed cell, where the second portion is less than or equal to remaining portion of the total transmit power after allocating the first portion to the uplink channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is an example timeline diagram illustrating channel state information measurement and reporting.

FIGS. 5A and 5B are example diagrams illustrating channel state information (CSI) measurement in a reference subframe and CSI reporting in a reporting subframe, according to an aspect of the disclosure.

FIGS. 6A and 6B are example diagrams illustrating CSI measurement in a reference subframe and CSI reporting in a reporting subframe, according to another aspect of the disclosure.

DETAILED DESCRIPTION

Figure 1:
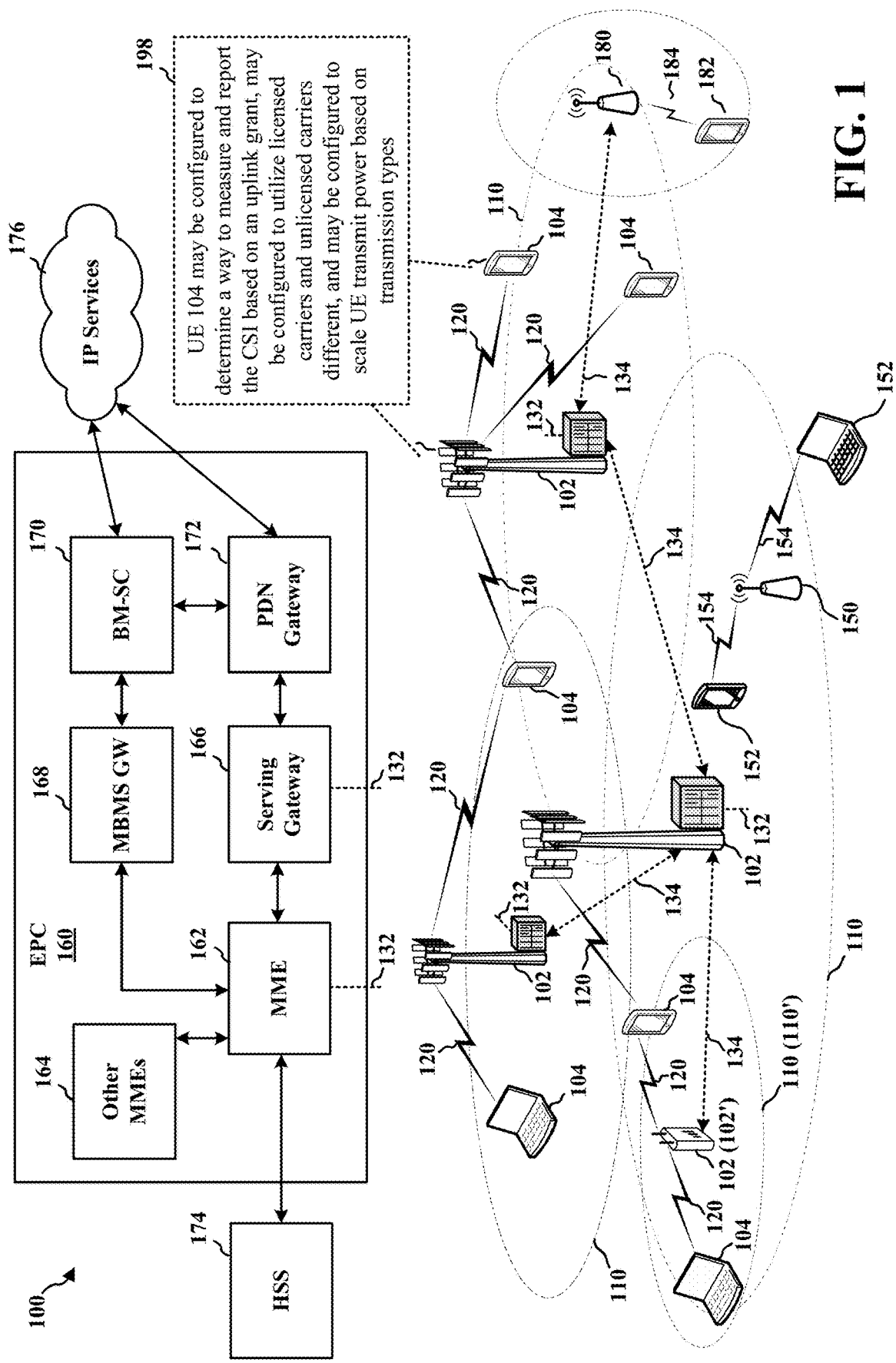
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 to compensate for the extremely high path loss and short range when communicating with UE 182.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine a way to measure and report the CSI based on an uplink grant, may be configured to utilize licensed carriers and unlicensed carriers different, and may be configured to scale UE transmit power based on transmission types (198).

Figure 2:
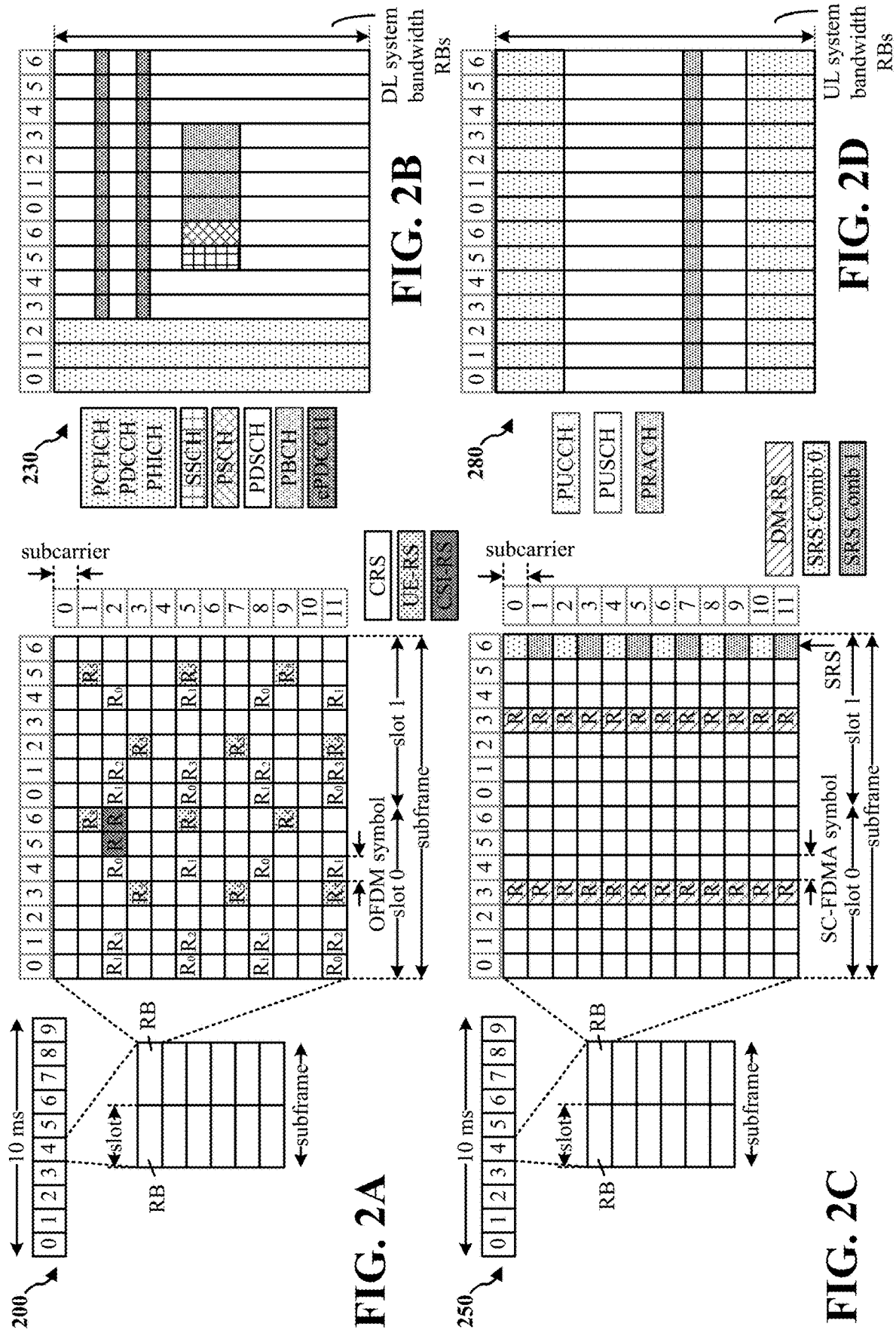
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
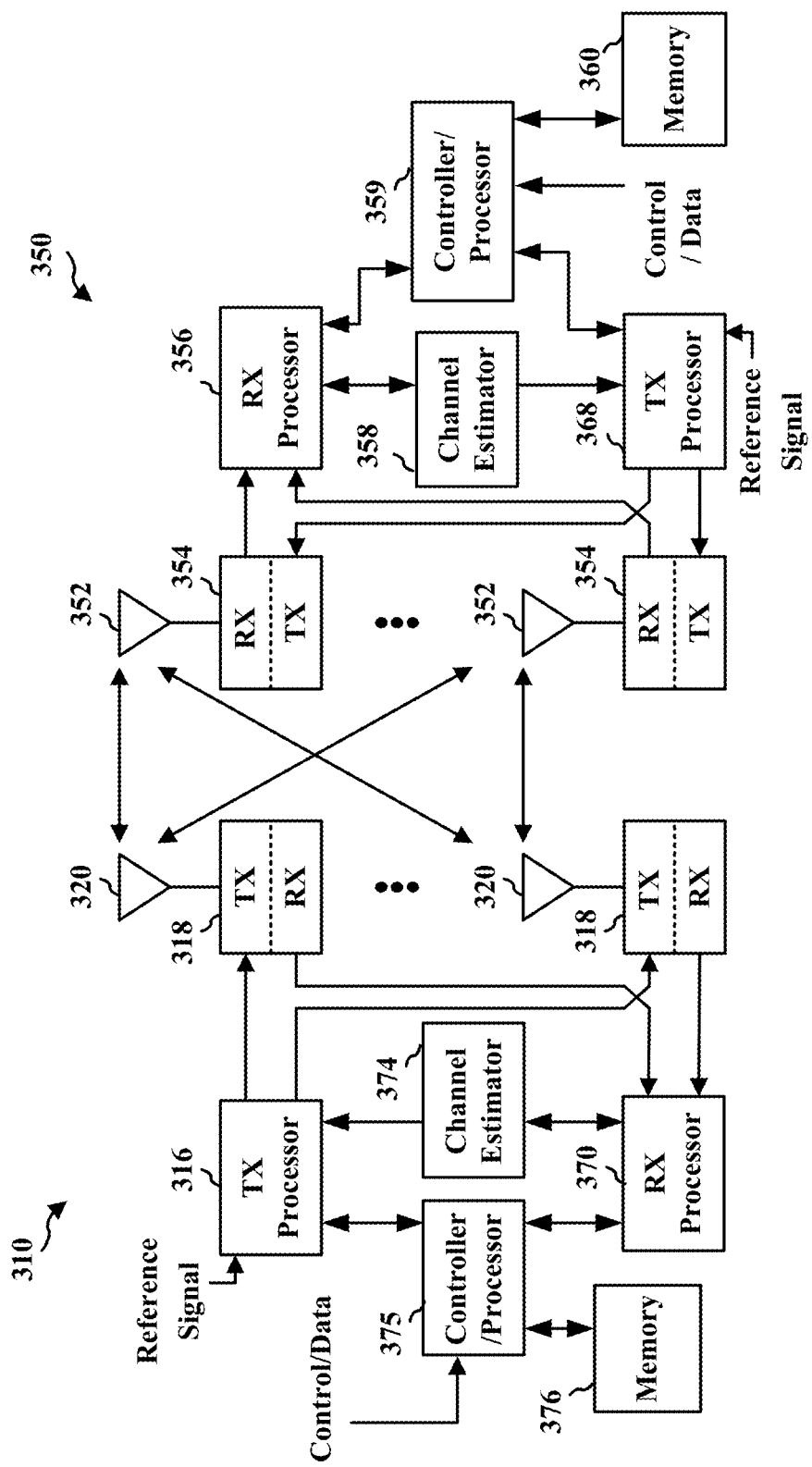
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

FIG. 4 is an example timeline diagram 400 illustrating channel state information (CSI) measurement and reporting. The timeline diagram 400 shows interactions involving a UE 410 and a base station 420 over time.

The UE 410 receives an uplink grant from the base station 420, at 452. The UE 410 may receive an uplink grant in a trigger subframe. The uplink grant may indicate that the UE 410 may perform an UL transmission. In an aspect, the uplink grant may indicate available resources for uplink communication.

At 454, the UE 410 determines a reference subframe to measure CSI for reporting, and determines a reporting subframe to report the CSI. The reference subframe may be a downlink subframe. For example, the reference subframe may be located at or later than the subframe where the uplink grant is received, and before the reporting subframe. For example, the UE may determine the reporting subframe based on a delay between reception of the uplink grant and an uplink transmission, where the delay is indicated in the uplink grant.

At 456, the UE 410 measures CSI based on a downlink communication from the base station 420. The UE 410 may measure the CSI based on reception conditions of the downlink communication in the reference subframe.

At 458, the UE 410 reports the CSI to the base station 420. The UE 410 may report the CSI in the reporting subframe.

The CSI measurement and reporting may be periodic or aperiodic. To perform the periodic CSI measurement, the UE 410 may measure the CSI periodically. The UE 410 may perform the aperiodic CSI measurement when the aperiodic CSI measurement is triggered by a CSI trigger (e.g., via DCI) received at the UE 410.

For periodic CSI measurement and reporting in LAA, the UE may perform the CSI measurement by selecting a latest valid reference subframe among several reference subframes to measure the CSI, and report the measured CSI to a base station. The reference subframes may be DL subframes. A valid reference subframe may be a downlink subframe where CSI may be measured based on reception conditions in the downlink subframe. The latest valid reference subframe may be a last reference subframe in time before a reporting subframe in which the CSI is reported. For channel estimation based on a CRS and/or CSI reference signal (CSI-RS) for periodic CSI reporting, the latest valid reference subframe is used as a reference subframe for CSI reporting. To determine that a subframe is a valid reference subframe, the UE may detect a CRS transmission in symbol 0 of a subframe and determine that the subframe is a full subframe. If the UE does not detect the CRS transmission in the subframe, the UE may determine that the base station has not transmitted a CRS to the UE in the subframe, and thus the subframe is not a valid reference subframe. For CRS-based channel estimation, the subframe for channel estimation is a non-MBSFN subframe. For CSI-RS based channel estimation, the reference subframe should have valid CSI-RS transmissions.

The UE may not perform averaging of channel estimates across different transmissions because power variation on the CRS/CSI-RS transmissions may be unknown. For interference estimation, the UE may not estimate interference in subframes in which the base station does not transmit. Periodic CSI may be measured at a fixed reference subframe, where the timing delay between an uplink grant and an uplink transmission is fixed, and a trigger for a grant should be received in a subframe that carries reference resources. For example, if an uplink grant is sent in subframe n−4, the reference resources will be in subframe n−4, and the UE may perform uplink transmission in subframe n (e.g., to report the CSI in subframe n).

For aperiodic CSI measurement in LAA, the reference subframe may be fixed at subframe "n−4" if the CSI is transmitted in subframe "n" for a frame structure type 1 (FS1) based transmission, for example. In other words, the subframe in which the UL grant is received is a valid reference subframe for CSI measurement. Similarly for TDD systems based on frame structure type 2 (FS2), the reference subframe may be a fixed subframe (determined based on the FS2 configuration) based on the subframe in which CSI is to be transmitted.

When determining the reference subframe for aperiodic CSI in enhanced LAA (eLAA), the timing delay between the UL grant and the UL transmission may be configurable from 0 to 15 subframes, so as to provide flexibility in configuring a reference subframe for CSI measurement. Further, multiple transmission time interval (multi-TTI) grants may be supported where the subframe in which CSI is transmitted is a function of the number of scheduled subframes in the grant.

For eLAA, a reference subframe may be updated based on signaling from a base station because there may be a long delay between the triggering of CSI in the UL grant and the transmission of CSI. The updated reference subframe may be different for channel and interference estimation. In a first scenario, (e.g., due to specific channel and interference conditions) the base station may receive an aperiodic CSI report based on a triggering subframe in which a UL grant is received by the UE. In the first scenario, the UE may receive a UL grant in a triggering subframe and report the CSI measured in the triggering subframe, treating the triggering subframe as a reference subframe. In a second scenario, the base station may receive an aperiodic CSI report based on the latest reference subframe used for UL transmission after the triggering subframe in which a UL grant is received by the UE. Thus, in the second scenario, the UE may receive a UL grant in a triggering subframe, determine a latest reference subframe after the triggering subframe, and report the CSI that is measured in the latest reference subframe. In addition, for frame structure type 3 (FS3), because the DL-UL configurations are dynamic DL-UL configurations, triggering aperiodic CSI in a subframe by the base station may be advantageous. Instead of being limited to the first scenario or the second scenario, flexibility to choose between the triggering subframe and the latest reference subframe as a reference subframe for which CSI to report is desired. Thus, an approach to provide flexibility for the base station to choose between the reference resources in the triggering subframe and the reference resources in the latest reference subframe is desired.

In an aspect, the base station may configure the UE with an indication of a type of reference subframe to be used for aperiodic CSI reporting via semi-static RRC signaling and/or via dynamic indication in the DCI. When the UE receives an RRC signal or DCI that has an indication of a type of reference subframe for aperiodic CSI reporting, the UE may determine a reference subframe for which CSI is reported based on the type of reference subframe.

In an aspect, in a first case corresponding to a first type of reference subframe, the reference subframe for aperiodic CSI reporting is the triggering subframe. Thus, in the first case, if the base station indicates to the UE the first type of reference subframe, the UE uses the reference resources in the triggering subframe to measure CSI. In a second case corresponding to a second type of reference subframe, the reference subframe for aperiodic CSI reporting is a subframe located before the reporting subframe in which the CSI is transmitted. For example, in the second case, the reference subframe for aperiodic CSI reporting is a subframe located one or more subframes before the reporting subframe. Thus, in the second case, if the base station indicates to the UE the second type of reference subframe, the UE determines the reference subframe based on the reporting subframe. In one example, the UE may determine the reference subframe for CSI measurement to be at least a predefined number of subframes before the reporting subframe. For example, in the second case, the reference subframe for aperiodic CSI reporting may be located after the triggering subframe, and thus the CSI may be measured after the triggering subframe and before the reporting subframe.

In an aspect, when the UE receives an uplink grant in a triggering subframe, the uplink grant may include information about a reporting subframe in which the CSI is transmitted. For example, the grant may include information about a delay between the uplink grant and a reporting subframe in which the CSI is transmitted. Thus, in such an aspect, when the UE receives the uplink grant in the triggering subframe, the UE may determine the reporting subframe based on the delay information included in the uplink grant.

FIGS. 5A and 5B are example diagrams illustrating CSI measurement in a reference subframe and CSI reporting in a reporting subframe, according to an aspect of the disclosure. FIG. 5A is an example diagram 500 illustrating the first case where the reference subframe is the triggering subframe, according to an aspect of the disclosure. In the example diagram 500 of FIG. 5A, the UE receives the UL grant in subframe (n−9). In FIG. 5A, because the UE received (e.g., via an RRC signal or DCI) an indication from the base station to use the first type of reference subframe, the UE determines that the reference subframe for CSI measurement is the triggering subframe, which is subframe n−9. Thus, the UE may measure the CSI in subframe n−9. Subsequently, the UE reports in the reporting subframe (subframe n) the CSI measured in subframe n−9. FIG. 5B is an example diagram 550 illustrating the second case where the reference subframe is determined based on the reporting subframe, according to an aspect of the disclosure. In the example diagram 550 of FIG. 5B, the UE receives the UL grant in subframe n−9. Because the UE received (e.g., via an RRC signal or DCI) an indication from the base station to use the second type of reference subframe, the UE determines that the reference subframe for CSI measurement may be at least 4 subframes before the reporting subframe (subframe n). For example, the UE may select any valid reference subframe for CSI measurement that is at least 4 subframes before the reporting subframe and after the triggering subframe. Thus, in the example of FIG. 5B, the UE may select any one of valid reference subframes n−4, n−5, n−6, n−7, and n−8 as a reference subframe for CSI measurement. As discussed above, a valid reference subframe may be a downlink subframe where CSI may be measured based on reception conditions in the downlink subframe. In one aspect, the UE may select the latest valid reference subframe, which is subframe n−4, as the reference subframe for CSI measurement. Hence, as shown in FIG. 5B, the UE may measure the CSI in subframe n−4. In an aspect, the UE may determine that a subframe is a valid reference subframe if the UE can detect a CRS transmission in symbol 0 of the subframe and determine that the subframe is a full subframe. After measuring the CSI in subframe n−4, the UE reports in the reporting subframe (subframe n) the CSI measured in subframe n−4.

In another aspect, the UE receives a UL grant that indicates that the UE may perform UL transmission, but the UL grant may not include information about a reporting subframe in which UL transmission is performed. Thus, sometime after receiving the UL grant, the UE may receive a trigger signal indicating one or more reporting subframes in which UL transmission may be performed. For example, the trigger signal may indicate a delay between the trigger signal and a reporting subframe in which the CSI is transmitted. FIGS. 6A and 6B are example diagrams illustrating CSI measurement in a reference subframe and CSI reporting in a reporting subframe, according to another aspect of the disclosure. FIG. 6A is an example diagram 600 illustrating the first case where the reference subframe is the triggering subframe, according to another aspect of the disclosure. In the example diagram 600 of FIG. 6A, the UE receives a UL grant in subframe p. Because the UE received an indication from the base station to use the first type of reference subframe, the UE determines that the reference subframe for CSI measurement is the triggering subframe, which is subframe p. Thus, the UE may measure the CSI in subframe p. Sometime after receiving the UL grant, the UE receives a trigger signal (e.g., in subframe n−6) indicating that a reporting subframe in which the CSI measurement is to be transmitted is subframe n (e.g., indicating a 6 subframe delay from the trigger signal). The UE reports in the reporting subframe (subframe n) the CSI measured in subframe p. FIG. 6B is an example diagram 650 illustrating the second case where the reference subframe is determined based on the reporting subframe, according to another aspect of the disclosure. In the example diagram 650 of FIG. 6B, the UE receives the UL grant in subframe p. Because the UE received an indication from the base station to use the second type of reference subframe, the UE determines that the reference subframe for CSI measurement may be at least 4 subframes before the reporting subframe. For example, the UE may select any valid reference subframe for CSI measurement that is at least 4 subframes before the reporting subframe and after the triggering subframe. Sometime after receiving the UL grant, the UE receives a trigger signal (e.g., in subframe n−6) indicating that a reporting subframe in which the CSI measurement is to be transmitted is subframe n (e.g., indicating a 6 subframe delay from the trigger signal). Subsequently, because the reference subframe for CSI measurement may be at least 4 subframes before the reporting subframe, the UE may select any one of valid reference subframes n−4 and n−5 as a reference subframe for CSI measurement. The UE may select the latest valid reference subframe, which is subframe n−4, as the reference subframe for CSI measurement. Hence, as shown in FIG. 6B, the UE may measure the CSI in subframe n−4. The UE reports in the reporting subframe (subframe n) the CSI measured in subframe n−4.

Figure 7:
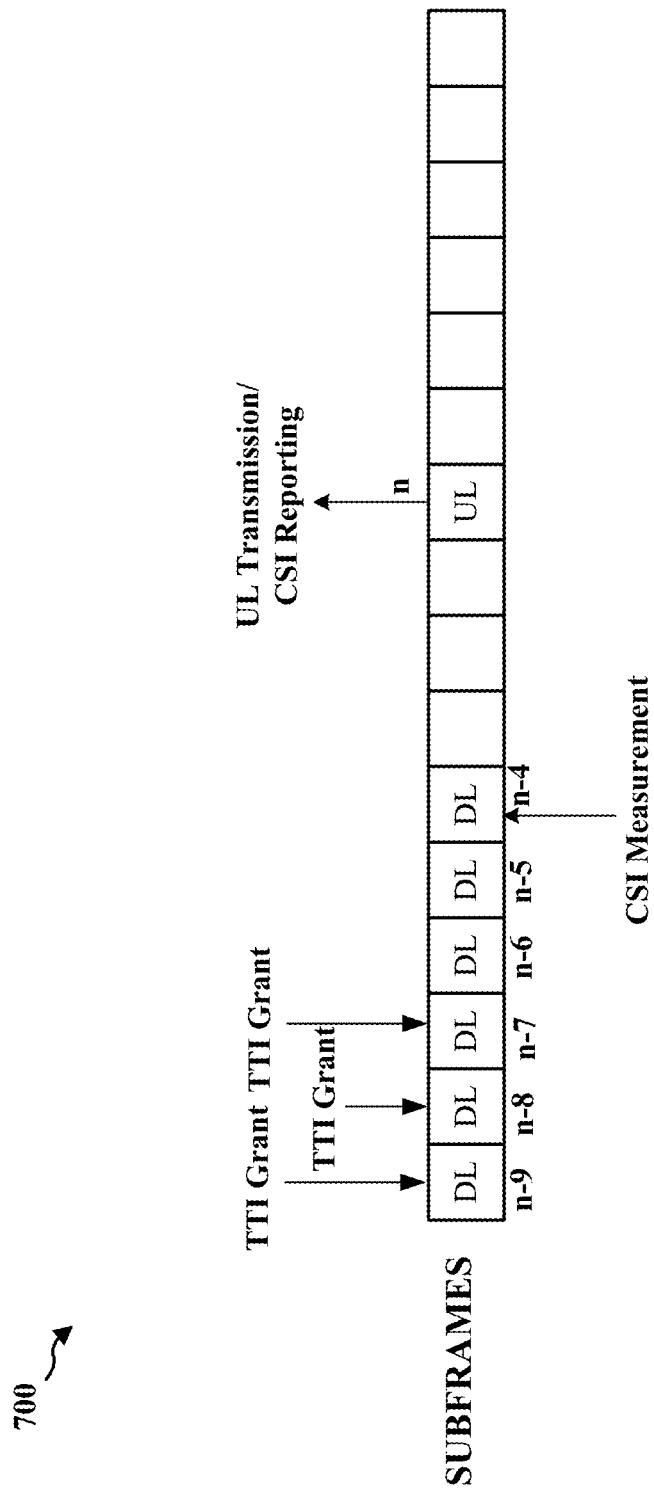
FIG. 7 is an example diagram illustrating channel state information measurement and reporting based on multiple transmission time interval grants.

In an aspect, for multi-TTI grants triggering aperiodic CSI based on the subframe in which CSI is transmitted, the UE may determine a reference subframe for CSI measurement based on the reporting subframe in which the CSI is reported. The multi-TTI grants may be dynamically indicated in a DCI. At least one of the multi-TTI grants may indicate the reporting subframe. FIG. 7 is an example diagram 700 illustrating CSI measurement and reporting based on multi-TTI grants. The UE receives the multi-TTI grants in subframes n−7, n−8, n−9. Because the UE received multi-TTI grants, the UE determines that the reference subframe for CSI measurement is based on the reporting subframe, and may be at least 4 subframes before the reporting subframe (subframe n). Thus, the UE may select any one of valid reference subframes n−4, n−5, and n−6 as a reference subframe for CSI measurement. The UE may select the latest valid reference subframe, which is subframe n−4, as the reference subframe for CSI measurement. Hence, as shown in FIG. 7, the UE may measure the CSI in subframe n−4. The UE reports in the reporting subframe (subframe n) the CSI measured in subframe n−4.

In an aspect, collision between periodic CSI measurement/reporting and aperiodic CSI measurement/reporting may also be considered. The UE may not be configured to transmit HARQ ACK or NACK of the licensed carriers on the unlicensed carriers. Thus, configuration of simultaneous transmission of a PUCCH on a the licensed carrier and a PUSCH on an unlicensed carrier may be supported for eLAA. In this scenario, the UE may transmit periodic CSI on the licensed carrier and aperiodic CSI on the unlicensed carrier. For example, the UE may transmit periodic CSI and/or HARQ ACK/NACK on a PUCCH (e.g. on a primary cell in a licensed spectrum), and may transmit aperiodic CSI and/or HARQ ACK/NACK on a PUSCH (e.g., on a secondary cell in an unlicensed spectrum). Assuming both the PUCCH and the PUSCH are on the licensed carriers, since simultaneous transmission of the PUCCH and the PUSCH may not be desirable on the licensed carriers, the periodic CSI that was to be carried via the PUCCH may be transmitted via the PUSCH on the licensed carrier using UCI piggybacking and the PUCCH with the periodic CSI may be dropped.

However, when aperiodic CSI is to be transmitted via a PUSCH on the unlicensed carrier, the HARQ ACK/NACK on the licensed carrier may have a high priority and may not be transmitted on the unlicensed carrier. In other words, HARQ ACK/NACK on the licensed carrier may not be carried on the unlicensed carrier while the CSI may still be carried on the unlicensed carrier. Various aspects may address such a scenario.

In an aspect, for HARQ ACK/NACK reporting in eLAA when the UE is configured for carrier aggregation (CA), a HARQ ACK/NACK cell group may be defined with at least one licensed carrier (e.g., in a primary cell) carrying a PUCCH and with one or more unlicensed carriers (e.g., in a secondary cell). The HARQ ACK/NACK of all the serving cells in the HARQ ACK/NACK cell group may be reported on the licensed carrier either on the PUCCH or on the PUSCH. With such a configuration, the HARQ ACK/NACK of the licensed carriers may not be transmitted on the unlicensed carrier. If a PUSCH is scheduled on an unlicensed carrier, the UE may simultaneously transmit a PUCCH and/or a PUSCH on the licensed carrier and a PUSCH on the unlicensed carrier.

In an aspect, for HARQ ACK/NACK reporting and/or periodic CSI reporting in eLAA, the UE may define the HARQ ACK/NACK cell group where the HARQ ACK/NACK and/or periodic CSI are reported only on the licensed carriers provided by the HARQ ACK/NACK cell group. The HARQ ACK/NACK and/or the periodic CSI may be reported on the licensed carrier either on the PUCCH or on the PUSCH. Thus, the HARQ ACK/NACK and/or the periodic CSI report for serving cells in a HARQ ACK/

NACK cell group may be carried on the licensed carrier and may not be carried on the unlicensed carrier, which is consistent with eLAA that may not allow a PUCCH on the unlicensed carrier.

In an aspect, for aperiodic CSI reporting in eLAA, the UE may define a cell group for licensed carriers (e.g., in the primary cell) and a cell group for unlicensed carriers (e.g., in the secondary cell), and thus may utilize a dual connectivity framework that allows the UE to connect to two different cell groups (e.g., the primary cell and the secondary cell). In particular, the aperiodic CSI reporting on the unlicensed carriers may be self-contained within the unlicensed carriers and may be independent of periodic and aperiodic CSI reporting on the licensed carriers. Thus, if the UE receives a trigger signal via a carrier in the cell group for licensed carriers, the aperiodic CSI reporting on the licensed carrier may be triggered (e.g., via a UL grant) on the licensed carrier, and may not be triggered on the unlicensed carrier. On the other hand, if the UE receives a trigger signal via a carrier in the cell group for unlicensed carriers, the aperiodic CSI reporting on the unlicensed carrier is triggered at the UE (e.g., via a UL grant) on the unlicensed carrier and cannot be triggered on the licensed carrier. The UE may simultaneously transmit periodic CSI on the licensed carrier and aperiodic CSI on the unlicensed carrier. Alternatively, the UE may simultaneously transmit periodic CSI and aperiodic CSI on the same unlicensed carrier. In an aspect, one aperiodic CSI cell group including unlicensed carriers may be defined for a UE configured for CA.

In another aspect, the triggering of aperiodic CSI from the unlicensed carriers under the CA framework in a CA configuration may be prevented. If a number of CSI computations exceeds a limit imposed by a UE capability constraint for simultaneously handling several CSI measurement/reporting processes, the UE may drop the aperiodic CSI on the unlicensed carrier.

A UE configured for CA may have a maximum transmit power constraint such that the UE may need to use a power scaling procedure to allocate transmit power to the configured carriers up to the maximum transmit power constraint. The UE may allocate transmit power to the configured carriers considering the CSI reporting procedure discussed above. The UE may consider different priorities for different carriers and/or different channels when allocating transmit power to the carriers (e.g., for transmitting an uplink channel such as a PUSCH or a PUSCH). For example, an uplink channel carrying HARQ ACK/NACK and/or CSI may have a higher priority than a channel that is not carrying the HARQ ACK/NACK and/or the CSI. Further, different priorities may be assigned for different types of transmissions (e.g., licensed carrier transmission v. unlicensed carrier transmission).

In an aspect, the UE may prioritize a licensed carrier carrying an uplink channel (e.g., PUCCH or a PUSCH) with UCI above other carriers, and thus first allocates the UE's transmit power to a licensed carrier carrying an uplink channel (e.g., PUCCH or a PUSCH) with UCI. After allocating the UE's transmit power to the licensed carrier carrying the uplink channel with the UCI, if there is any remaining transmit power at the UE, an unlicensed carrier with a aperiodic CSI transmission may be prioritized next, and thus the UE allocates the remaining transmit power or a portion of the remaining power to the unlicensed carrier with the aperiodic CSI transmission. After allocating the UE's transmit power to a licensed carrier carrying the uplink channel with the UCI and to an unlicensed carrier with the aperiodic CSI transmission, if the UE still has remaining transmit power, the remaining transmit power or a portion of the remaining transmit power may be shared among a subset of carriers including remaining licensed and unlicensed carriers equally if the carriers are allocated non-zero power. In particular, the UE may equally or unequally allocate up to the rest of the remaining power to communication on the licensed carriers and communication on the unlicensed carriers. Each transmit power allocation may be an allocation of a minimum transmit power for the UE to successfully transmit UL communication to the corresponding serving base station (e.g., to allow the serving base station to successfully receive the UL communication).

Figure 8:
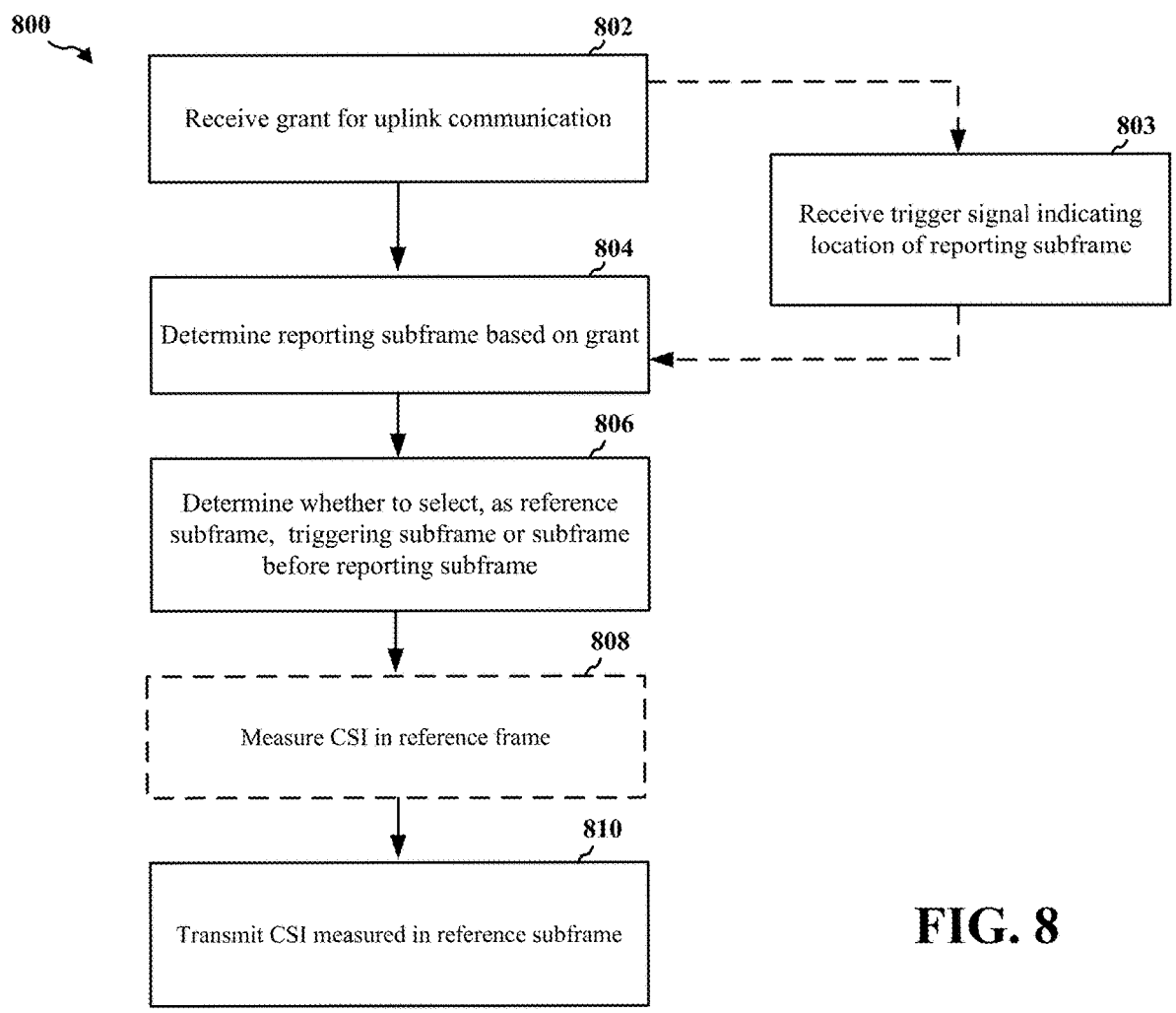
FIG. 8 is a flowchart of a method of wireless communication, according to an aspect of the disclosure.

FIG. 8 is a flowchart 800 of a method of wireless communication, according to an aspect of the disclosure. The method may be performed by a UE (e.g., the UE 410, the apparatus 1202/1202'). The flowchart 800 describes approaches to select a reference subframe to measure CSI in the reference subframe, and to report the measured CSI. The flowchart 800 further describes approaches to determine a reporting subframe where the measured CSI is transmitted.

At 802, the UE receives a grant for uplink communication. For example, as discussed supra, the UE may receive an uplink grant from a base station in a triggering subframe. For example, as discussed supra, the triggering subframe may be a downlink subframe. For example, as illustrated in FIGS. 5A and 5B, the UE may receive a UL grant in subframe n−9. For example, as discussed supra, the uplink grant may indicate that the UE may perform UL transmission.

At 804, the UE determines a reporting subframe based on the grant. For example, as discussed supra, the UE may select, based on the uplink grant, a reporting subframe in which the CSI is to be transmitted. For example, as discussed supra, the uplink grant may indicate available resources (e.g., available UL subframes) for uplink communication, and thus the UE may select the reporting subframe based on the available resources indicated in the uplink grant.

In an aspect, the grant indicates a delay between reception of the grant and an uplink transmission, and the reporting subframe is determined based on the delay. For example, as discussed supra, in an aspect, the uplink grant may include information about a delay between the uplink grant and a reporting subframe in which the CSI is transmitted. Thus, as discussed supra, when the UE receives the uplink grant, the UE may determine the reporting subframe based on the delay information included in the uplink grant.

In another aspect, at 803, the UE may receive a trigger signal indicating a location of the reporting subframe, where the UE may determine the reporting subframe based on the grant and the trigger signal. For example, as discussed supra, in an aspect, sometime after receiving the UL grant, the UE may receive a trigger signal indicating one or more reporting subframes in which UL transmission may be performed. For example, as discussed supra, the trigger signal may indicate a delay between the trigger signal and a reporting subframe. For example, as illustrated in FIGS. 6A and 6B, after receiving an uplink grant in subframe p, the UE may receive a trigger signal in subframe n−6, indicating that a reporting subframe in which the CSI measurement is to be transmitted is subframe n.

At 806, the UE determines whether to select, as a reference subframe, a triggering subframe in which the grant is received or a subframe before the reporting subframe. For example, as discussed supra, the base station may indicate to the UE either a first type of reference subframe or a second type of reference frame. For example, as discussed supra, if the base station indicates to the UE the first type of reference subframe, the UE uses the reference resources in the triggering subframe to measure CSI (e.g., as illustrated in FIG. 5A). For example, as discussed supra, if the base station indicates to the UE the second type of reference subframe, the UE determines the reference subframe based on the reporting subframe, where the reference subframe is located before the reporting subframe (e.g., as illustrated in FIG. 5B).

In an aspect, the UE may determine whether to select the triggering subframe or the subframe before the reporting subframe based on a RRC signal or a dynamic indication in DCI. For example, as discussed supra, the base station may configure the UE with an indication of a type of reference subframe to be used for aperiodic CSI reporting via semi-static RRC signaling and/or via dynamic indication in the DCI.

At 808, the UE may measure CSI in the reference subframe. For example, as discussed supra, the UE measures the CSI in the reference subframe. For example, as illustrated in FIG. 5A, the UE may measure the CSI in the reference subframe (subframe n−9). For example, as illustrated in FIG. 5B, the UE may measure the CSI in the reference subframe (subframe n−4).

At 810, the UE transmits, in the reporting subframe, the CSI measured in the reference subframe. For example, as discussed supra, the UE transmits the CSI measurement in the reporting subframe. For example, as illustrated in FIGS. 5A and 5B, the UE transmits, in the reporting subframe (subframe n), the CSI measured in the reference subframe.

In an aspect, the subframe before the reporting subframe may be located after the triggering subframe. For example, as discussed supra, in the second case where the reference subframe is located in a subframe before the reporting subframe, the reference subframe for aperiodic CSI reporting may be located after the triggering subframe. For example, as illustrated in FIG. 5B, the reference subframe for CSI measurement is subframe n−4 that is located after the triggering subframe (subframe n−9) and before the reporting subframe (subframe n). In such an aspect, the subframe before the reporting subframe may be located at least a predefined number of subframes before the reporting subframe. For example, as discussed supra, the UE may determine the reference subframe for CSI measurement to be at least a predefined number of subframes before the reporting subframe. For example, as illustrated in FIG. 5B, the UE may determine that the reference subframe for CSI measurement may be at least 4 subframes before the reporting subframe (subframe n), and thus may select subframe n−4 as the reference subframe.

In an aspect, the grant may include one or more multi-TTI grants dynamically indicated in a DCI. For example, as discussed supra, the multi-TTI grants may be dynamically indicated in a DCI, and at least one of the multi-TTI grants may indicate a reporting subframe. In such an aspect, the reporting subframe may be one of subframes indicated by one or more multi-TTI grants. For example, as discussed supra, at least one of the multi-TTI grants may include a grant indicating the reporting subframe in which the CSI is reported. In such an aspect, the subframe before the reporting subframe may be selected as the reference subframe based on the one or more multi-TTI grants. For example, as discussed supra in reference to FIG. 7, because the UE received multi-TTI grants, the UE determines that the reference subframe for CSI measurement is based on the reporting subframe, and may be at least 4 subframes before the reporting subframe (subframe n).

Figure 9:
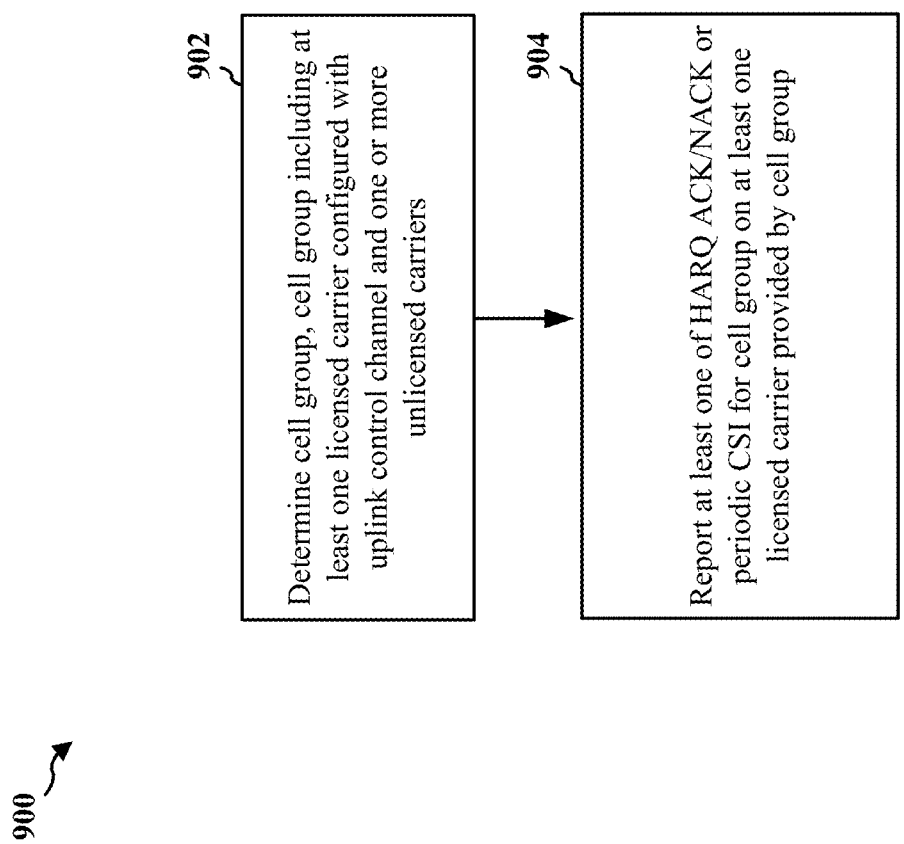
FIG. 9 is a flowchart of a method of wireless communication, according to another aspect of the disclosure.

FIG. 9 is a flowchart 900 of a method of wireless communication, according to an aspect of the disclosure. The method may be performed by a UE (e.g., the UE 410, the apparatus 1202/1202'). The flowchart 900 describes approaches to utilize a licensed carrier to report a HARQ ACK/NACK or periodic CSI, so as to be consistent with eLAA that may not allow a PUCCH on the unlicensed carrier. For example, the flowchart 900 describes approaches to define a HARQ ACK/NACK cell group with at least one licensed carrier carrying a PUCCH and with one or more unlicensed carriers, such that a HARQ ACK/NACK and/or a periodic CSI report for serving cells in the HARQ ACK/NACK cell group may be reported on the licensed carrier.

At 902, the UE determines a cell group, the cell group including at least one licensed carrier configured with an uplink control channel and one or more unlicensed carriers. For example, as discussed supra, a HARQ ACK/NACK cell group may be defined with at least one licensed carrier (e.g., in a primary cell) carrying a PUCCH and with one or more unlicensed carriers (e.g., in a secondary cell).

At 904, the UE reports at least one of a HARQ ACK/NACK or periodic CSI for the cell group on the at least one licensed carrier provided by the cell group. For example, as discussed supra, the UE may define the HARQ ACK/NACK cell group where the HARQ ACK/NACK and/or periodic CSI are reported only on the licensed carriers provided by the HARQ ACK/NACK cell group.

In an aspect, the at least one of the HARQ ACK/NACK or the periodic CSI are reported via the uplink control channel or an uplink shared channel. For example, as discussed supra, the HARQ ACK/NACK and/or the periodic CSI may be reported on the licensed carrier either on the PUCCH or on the PUSCH.

Figure 10:
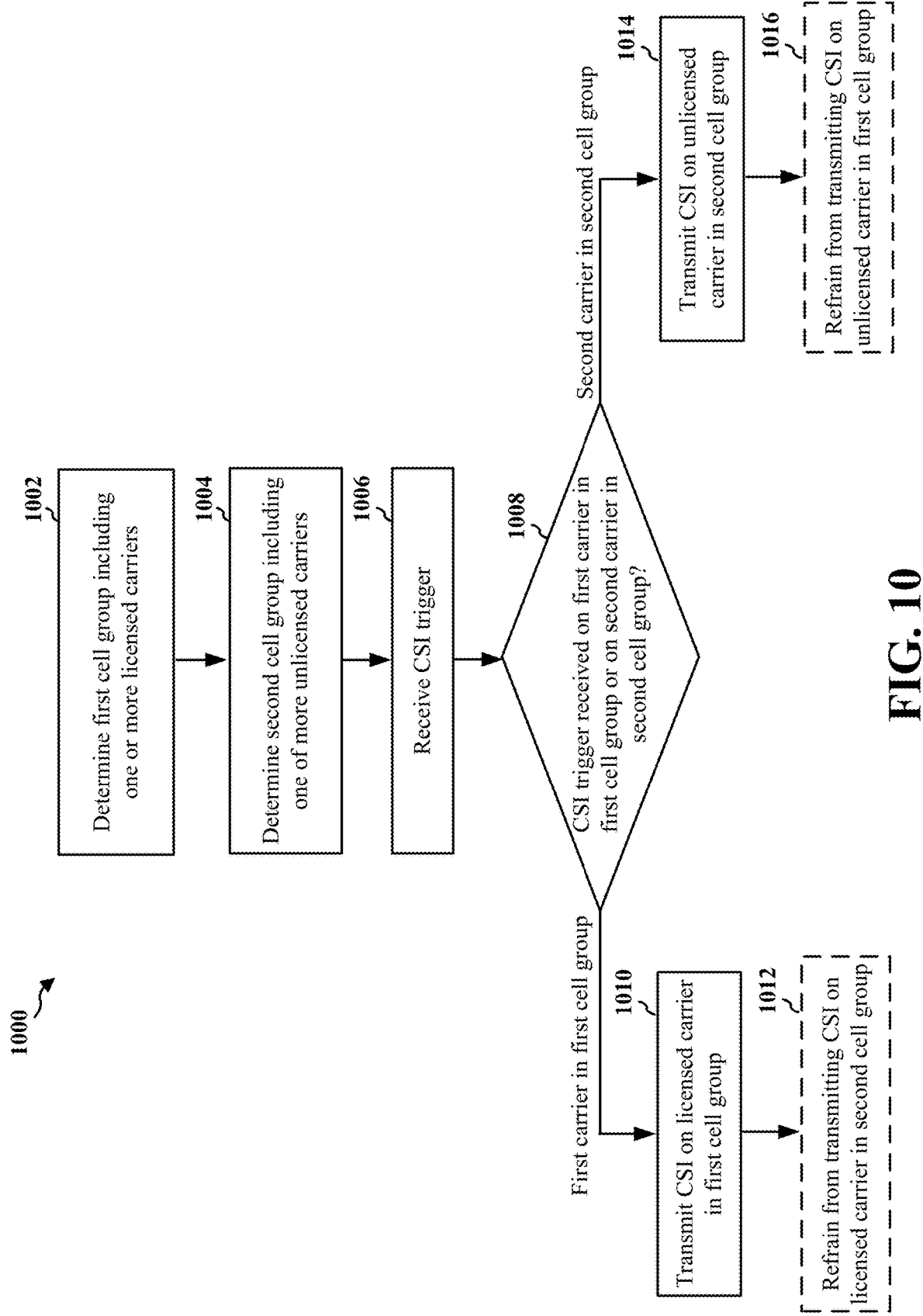
FIG. 10 is a flowchart of a method of wireless communication, according to another aspect of the disclosure.

FIG. 10 is a flowchart 1000 of a method of wireless communication, according to an aspect of the disclosure. The method may be performed by a UE (e.g., the UE 410, the apparatus 1202/1202'). The flowchart 1000 describes approaches to define a cell group for licensed carriers (e.g., in the primary cell) and a cell group for unlicensed carriers (e.g., in the secondary cell). The flowchart 1000 describes approaches to perform the aperiodic CSI reporting on the licensed carrier and not on the unlicensed carrier if the UE receives a trigger signal via a carrier in the cell group for licensed carriers. The flowchart 1000 describes approaches to perform the aperiodic CSI reporting on the unlicensed carrier and not on the licensed carrier if the UE receives a trigger signal via a carrier in the cell group for unlicensed carriers.

At 1002, the UE determines a first cell group including one or more licensed carriers. For example, as discussed supra, the UE may define a first cell group for licensed carriers.

At 1004, the UE determines a second cell group including one of more unlicensed carriers. For example, as discussed supra, the UE may define a second cell group for unlicensed carriers. For example, as discussed supra, for aperiodic CSI reporting in eLAA, the UE may define a first cell group for licensed carriers (e.g., in the primary cell) and a cell group for unlicensed carriers (e.g., in the secondary cell). Thus, the UE may utilize a dual connectivity framework.

At 1006, the UE receives a CSI trigger. For example, as discussed supra, the aperiodic CSI reporting at the UE may be triggered (e.g., via a UL grant from a base station). For example, as discussed supra, the CSI trigger may be received on a licensed carrier or on an unlicensed carrier.

At 1008, the UE determines whether the CSI trigger was received on a carrier in the first cell group or on a carrier in the second cell group. For example, as discussed supra, the UE may determine whether the UE receives a trigger signal via a carrier in the cell group for licensed carriers or via a carrier in the cell group for unlicensed carriers.

If the CSI trigger was received on a first carrier in the first cell group, at 1010, the UE transmits the CSI on a licensed carrier in the first cell group, and, at 1012, may refrain from transmitting the CSI on an unlicensed carrier in the second cell group. In an aspect, if the CSI trigger was received on the first carrier in the first cell group, the UE may transmit the CSI only on the licensed carrier in the first cell group. For example, as discussed supra, if the UE receives a trigger signal via a carrier in the cell group for licensed carriers, the aperiodic CSI reporting on the licensed carrier may be triggered (e.g., via a UL grant) on the licensed carrier, and may not be triggered on the unlicensed carrier.

If the CSI trigger was received on a second carrier in the second cell group, at 1014, the UE transmits the CSI on an unlicensed carrier in the second cell group, and at 1016, the UE may refrain from transmitting the CSI on a licensed carrier in the first cell group. In an aspect, if the CSI trigger was received on the second carrier in the first second group, the UE may transmit the CSI only on the unlicensed carrier in the second cell group. For example, as discussed supra, if the UE receives a trigger signal via a carrier in the cell group for unlicensed carriers, the aperiodic CSI reporting on the unlicensed carrier is triggered (e.g., via a UL grant) on the unlicensed carrier and cannot be triggered on the licensed carrier.

In an aspect, the second cell group for reporting aperiodic CSI on an unlicensed carrier in the second cell group may be a single group of cells. For example, as discussed supra, one aperiodic CSI cell group including unlicensed carriers may be defined for a UE configured for CA.

Figure 11:
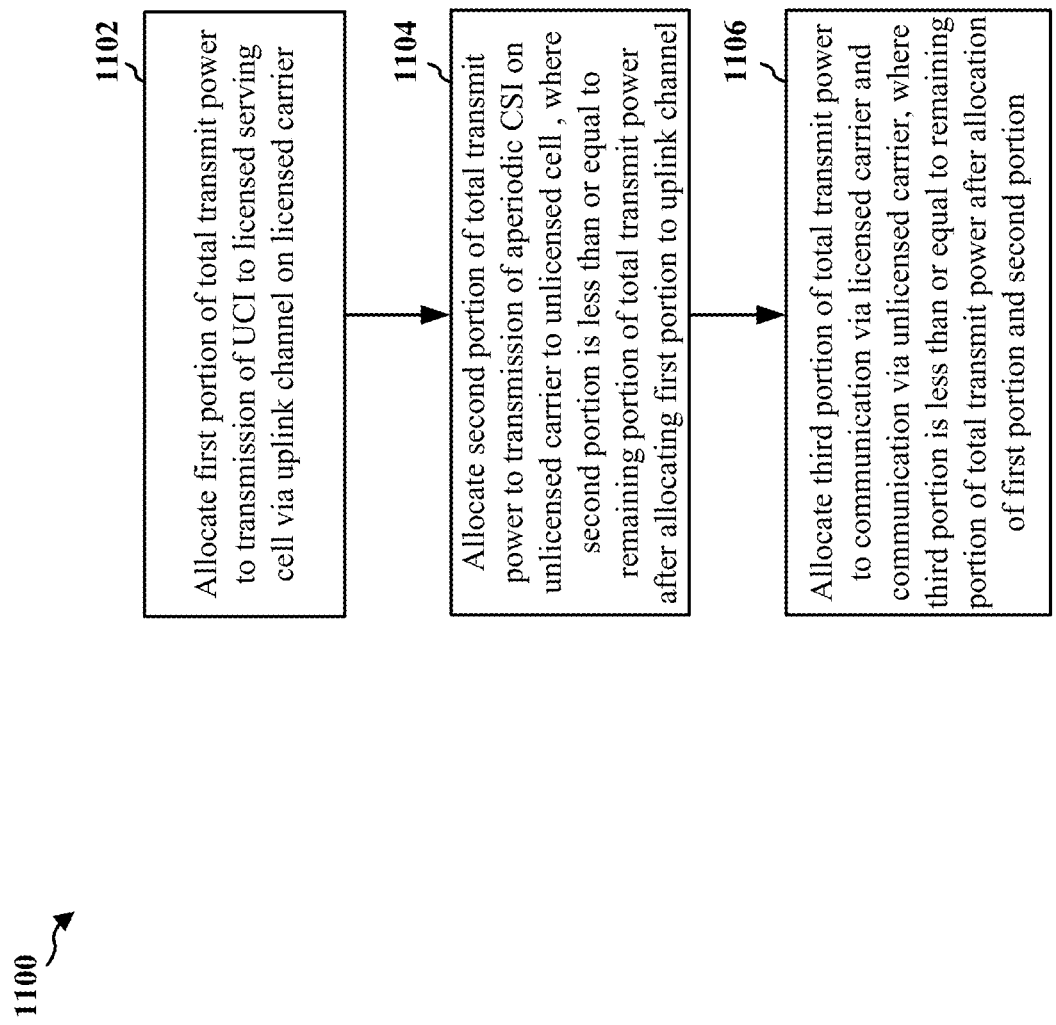
FIG. 11 is a flowchart of a method of wireless communication, according to another aspect of the disclosure.

FIG. 11 is a flowchart 1100 of a method of wireless communication, according to an aspect of the disclosure. The method may be performed by a UE (e.g., the UE 410, the apparatus 1202/1202'). The UE configured for CA may have a maximum transmit power constraint. Thus, the flowchart 1100 describes approaches to allocate transmit power to the configured carriers up to the maximum transmit power constraint (e.g., based on different priorities for different carriers and/or different channels).

At 1102, the UE allocates a first portion of a total transmit power to transmission of an uplink control information to a licensed serving cell via an uplink channel on a licensed carrier. In an aspect, the uplink channel includes at least one of a PUCCH or a PUSCH. For example, as discussed supra, the UE may prioritize a licensed carrier carrying an uplink channel (e.g., PUCCH or a PUSCH) with UCI above other carriers, and thus first allocates the UE's transmit power to a licensed carrier carrying an uplink channel (e.g., PUCCH or a PUSCH) with UCI.

At 1104, the UE allocates a second portion of the total transmit power to transmission of an aperiodic CSI on an unlicensed carrier to an unlicensed cell, where the second portion is less than or equal to remaining portion of the total transmit power after allocating the first portion to the uplink channel. For example, as discussed supra, after allocating the UE's transmit power to the licensed carrier carrying the uplink channel with the UCI, if there is any remaining transmit power at the UE, an unlicensed carrier with a aperiodic CSI transmission may be prioritized next, and thus the UE allocates the remaining transmit power or a portion of the remaining transmit power to the unlicensed carrier with the aperiodic CSI transmission.

At 1106, the UE allocates a third portion of the total transmit power to a first communication via the licensed carrier and a second communication via the unlicensed carrier, where the third portion is less than or equal to remaining portion of the total transmit power after the allocation of the first portion and the second portion. For example, as discussed supra, after allocating the UE's transmit power to a licensed carrier carrying the uplink channel with the UCI and to an unlicensed carrier with the aperiodic CSI transmission, if the UE still has remaining transmit power, up to the remaining transmit power may be shared among a subset of carriers including remaining licensed and unlicensed carriers equally if the carriers are allocated non-zero power.

In an aspect, the third portion is allocated equally to the first communication via the licensed carrier and the second communication via the unlicensed carrier. For example, as discussed supra, the UE may equally or unequally allocate the rest of the remaining power to communication on the licensed carriers and communication on the unlicensed carriers.

Figure 12:
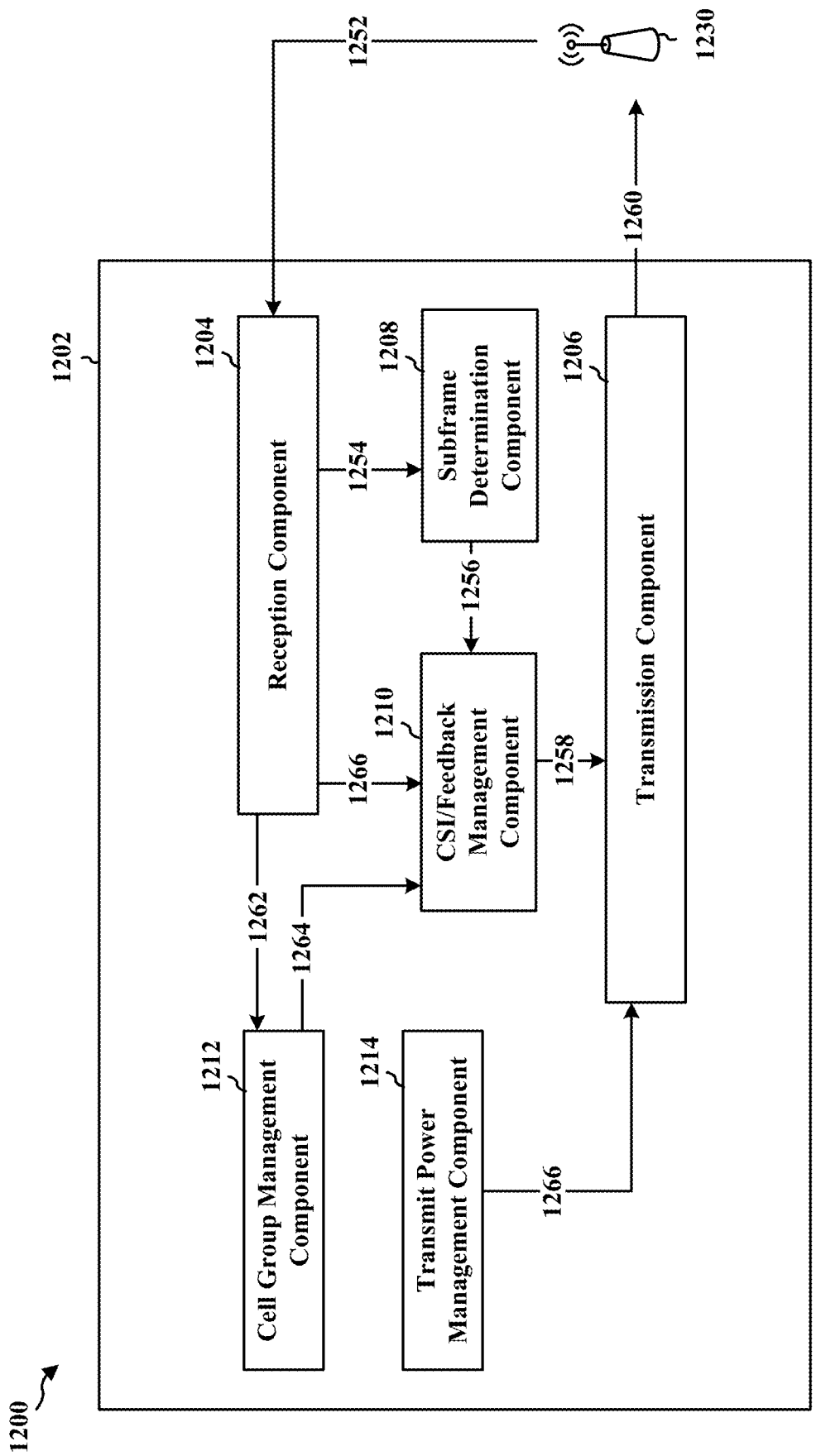
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a UE. The apparatus includes a reception component 1204, a transmission component 1206, a subframe determination component 1208, a CSI/Feedback management component 1210, a cell group management component 1212, and a transmit power management component 1214.

According to an aspect of the disclosure, the subframe determination component 1208 receives a grant for uplink communication (e.g., from a base station 1230), via the reception component 1204, at 1252 and 1254. The subframe determination component 1208 determines a reporting subframe based on the grant. In an aspect, the grant may indicate a delay between reception of the grant and an uplink transmission, and the reporting subframe may be determined based on the delay. In another aspect, the subframe determination component 1208 may receive a trigger signal indicating a location of the reporting subframe), via the reception component 1204, at 1252 and 1254, where the subframe determination component 1208 may determine the reporting subframe based on the grant and the trigger signal.

The subframe determination component 1208 determines whether to select, as a reference subframe, a triggering subframe in which the grant is received or a subframe before the reporting subframe. In an aspect, the subframe determination component 1208 may determine whether to select the triggering subframe or the subframe before the reporting subframe based on a RRC signal or a dynamic indication in DCI. The subframe determination component 1208 may forward information about the reference subframe to the CSI/Feedback management component 1210, at 1256. The CSI/Feedback management component 1210 may measure CSI in the reference subframe. The CSI/Feedback management component 1210 transmits, in the reporting subframe, CSI/Feedback measured in the reference subframe (e.g., to the base station 1230), via the transmission component 1206, at 1258 and 1260.

In an aspect, the subframe before the reporting subframe is located after the triggering subframe. In such an aspect, the subframe before the reporting subframe is located at least a predefined number of subframes before the reporting subframe.

In an aspect, the grant includes one or more multi-TTI grants dynamically indicated in a DCI. In such an aspect, the reporting subframe is one of subframes indicated by one or more multi-TTI grants. In such an aspect, the subframe before the reporting subframe is selected as the reference subframe based on the one or more multi-TTI grants.

According to another aspect of the disclosure, the cell group management component 1212 determines a cell group, the cell group including at least one licensed carrier configured with an uplink control channel and one or more unlicensed carriers (e.g., based on information received from the base station 1230 at 1252 and 1262). The cell group management component 1212 may forward information about the cell group to the CSI/Feedback management component 1210, at 1264. The CSI/Feedback management component 1210 reports at least one of a HARQ ACK/NACK or periodic CSI for the cell group on the at least one licensed carrier provided by the cell group (e.g., to the base station 1230), via the transmission component 1206, at 1258 and 1260. In an aspect, the at least one of the HARQ ACK/NACK or the periodic CSI are reported via the uplink control channel or an uplink shared channel.

According to another aspect of the disclosure, the cell group management component 1212 determines a first cell group including one or more licensed carriers. The cell group management component 1212 determines a second cell group including one of more unlicensed carriers. The cell group management component 1212 may forward information about the first cell group and the cell group to the CSI/Feedback management component 1210, at 1264. The CSI/Feedback management component 1210 receives a CSI trigger (e.g., from the base station 1230), via the reception component 1204, at 1252 and 1266. The CSI/Feedback management component 1210 determines whether the CSI trigger was received on a carrier in the first cell group or on a carrier in the second cell group. If the CSI trigger was received on a first carrier in the first cell group, the CSI/Feedback management component 1210 transmits (e.g., to the base station 1230) the CSI on a licensed carrier in the first cell group, via the transmission component 1206, at 1258 and 1260, and may refrain from transmitting the CSI on an unlicensed carrier in the second cell group. In an aspect, if the CSI trigger was received on the first carrier in the first cell group, the CSI/Feedback management component 1210 may transmit the CSI only on the licensed carrier in the first cell group, via the transmission component 1206, at 1258 and 1260. If the CSI trigger was received on a second carrier in the second cell group, the CSI/Feedback management component 1210 transmits (e.g., to the base station 1230) the CSI on an unlicensed carrier in the second cell group, via the transmission component 1206, at 1258 and 1260, and may refrain from transmitting the CSI on the licensed carrier in the first cell group. In an aspect, if the CSI trigger was received on the second carrier in the first second group, the CSI/Feedback management component 1210 may transmit the CSI only on the unlicensed carrier in the second cell group, via the transmission component 1206, at 1258 and 1260. In an aspect, the second cell group for reporting aperiodic CSI on an unlicensed carrier in the second cell group may be a single group of cells.

According to another aspect of the disclosure, the transmit power management component 1214 allocates a first portion of a total transmit power to transmission of an UCI to a licensed serving cell via an uplink channel on a licensed carrier. In an aspect, the uplink channel may include at least one of a PUCCH or a PUSCH. The transmit power management component 1214 allocates a second portion of the total transmit power to transmission of an aperiodic CSI on an unlicensed carrier to an unlicensed cell, where the second portion is less than or equal to remaining portion of the total transmit power after allocating the first portion to the uplink channel. The transmit power management component 1214 allocates a third portion of the total transmit power to a first communication via the licensed carrier and a second communication via the unlicensed carrier, where the third portion is less than or equal to remaining portion of the total transmit power after the allocation of the first portion and the second portion. In an aspect, the third portion is allocated equally to the first communication via the licensed carrier and the second communication via the unlicensed carrier. The transmit power management component 1214 may forward the information about the transmit power allocation to the transmission component 1206, at 1266, such that the transmission component 1206 may perform transmission based on the transmit power allocation.

The apparatus may include additional components that perform each of the blocks of the algorithm in the aforementioned flowcharts of FIGS. 8-11. As such, each block in the aforementioned flowcharts of FIGS. 8-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
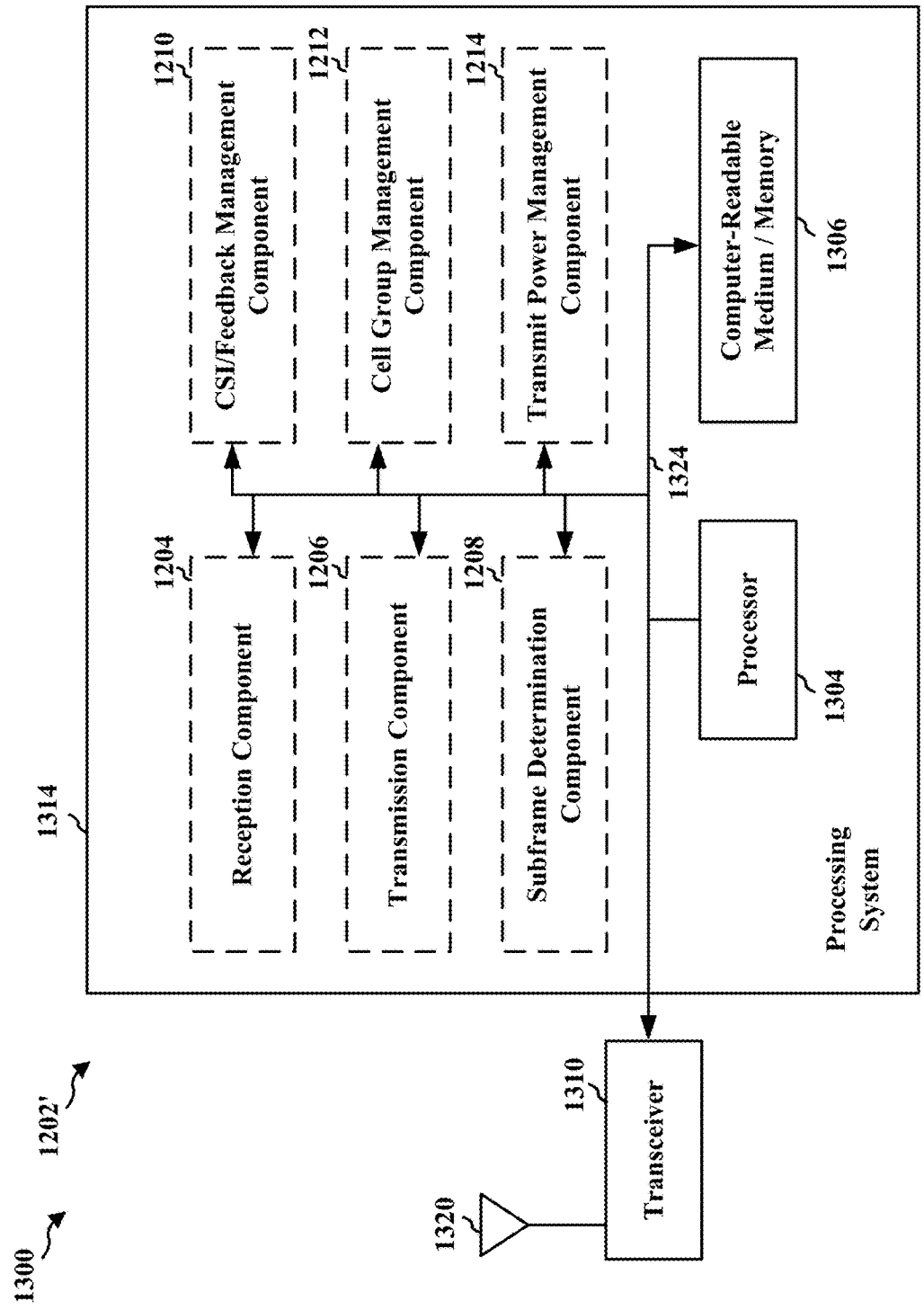
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for receiving a grant for uplink communication, means for determining a reporting subframe based on the grant, means for determining whether to select, as a reference subframe, a triggering subframe in which the grant is received or a subframe before the reporting subframe, and means for transmitting, in the reporting subframe, CSI measured in the reference subframe. In an aspect, the apparatus 1202/1202' may further include means for receiving a trigger signal indicating a location of the reporting subframe, where the means for determining the reporting subframe is configured to determine the reporting subframe based on the grant and the trigger signal. In an aspect, the means for determining whether to select the triggering subframe or the subframe before the reporting subframe is configured to determine whether to select the triggering subframe or the subframe before the reporting subframe based on an RRC signal or a dynamic indication in downlink control information.

In another configuration, the apparatus 1202/1202' for wireless communication includes means for determining a cell group, the cell group including at least one licensed carrier configured with an uplink control channel and one or more unlicensed carriers, and means for reporting at least one of a hybrid automatic repeat request (HARQ) acknowledgement/negative-acknowledgement (ACK/NACK) or periodic channel state information (CSI) for the cell group on the at least one licensed carrier provided by the cell group.

In another configuration, the apparatus 1202/1202' for wireless communication includes means for determining a first cell group including one or more licensed carriers, means for determining a second cell group including one of more unlicensed carriers, means for receiving a CSI trigger, means for transmitting the CSI on a licensed carrier in the first cell group if the CSI trigger was received on a first carrier in the first cell group, and means for transmitting the CSI on an unlicensed carrier in the second cell group if the CSI trigger was received on a second carrier in the second cell group. In an aspect, the apparatus 1202/1202' may further include means for refraining from transmitting the CSI on a licensed carrier in the first cell group if the CSI trigger was received on the second carrier in the second cell group, and means for refraining from transmitting the CSI on an unlicensed carrier in the second cell group if the CSI trigger was received on the first carrier in the first cell group.

In another configuration, the apparatus 1202/1202' for wireless communication includes means for allocating a first portion of a total transmit power to transmission of an uplink control information to a licensed serving cell via an uplink channel on a licensed carrier, and means for allocating a second portion of the total transmit power to transmission of an aperiodic CSI on an unlicensed carrier to an unlicensed cell, where the second portion is less than or equal to remaining portion of the total transmit power after allocating the first portion to the uplink channel. In an aspect, the apparatus 1202/1202' may further include means for allocating a third portion of the total transmit power to a first communication via the licensed carrier and a second communication via the unlicensed carrier, where the third portion is less than or equal to remaining portion of the total transmit power after the allocation of the first portion and the second portion.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE) in a shared spectrum, comprising:
   determining a cell group, the cell group including at least one licensed carrier configured with an uplink control channel and one or more unlicensed carriers;

reporting at least one of a hybrid automatic repeat request (HARQ) acknowledgement/negative-acknowledgement (ACK/NACK) or periodic channel state information (CSI) for the cell group on the at least one licensed carrier provided by the cell group; and reporting an aperiodic CSI for the cell group on the one or more unlicensed carriers provided by the cell group.

2. The method of claim 1, wherein the at least one of the HARQ ACK/NACK or the periodic CSI are reported via the uplink control channel or an uplink shared channel.

3. The method of claim 1, wherein the at least one of the HARQ ACK/NACK or the periodic CSI are reported only on the at least one licensed carrier provided by the cell group.

4. The method of claim 1, wherein the aperiodic CSI is reported via an uplink shared channel.

5. The method of claim 4, wherein the at least one of the HARQ ACK/NACK or the periodic CSI are reported via the uplink control channel.

6. A user equipment (UE) for wireless communication in a shared spectrum, comprising:
   means for determining a cell group, the cell group including at least one licensed carrier configured with an uplink control channel and one or more unlicensed carriers;
   means for reporting at least one of a hybrid automatic repeat request (HARQ) acknowledgement/negative-acknowledgement (ACK-NACK) or periodic channel state information (CSI) for the cell group on the at least one licensed carrier provided by the cell group; and
   means for reporting an aperiodic CSI for the cell group on the one or more unlicensed carriers provided by the cell group.

7. The UE of claim 6, wherein the at least one of the HARQ ACK/NACK or the periodic CSI are reported via the uplink control channel or an uplink shared channel.

8. The UE of claim 6, wherein the at least one of the HARQ ACK/NACK or the periodic CSI are reported only on the at least one licensed carrier provided by the cell group.

9. The UE of claim 6, wherein the aperiodic CSI is reported via an uplink shared channel.

10. A user equipment (UE) for wireless communication in a shared spectrum, comprising:
    a memory; and
    at least one processor coupled to the memory and configured to:
      determine a cell group, the cell group including at least one licensed carrier configured with an uplink control channel and one or more unlicensed carriers;
      report at least one of a hybrid automatic repeat request (HARQ) acknowledgement/negative-acknowledgement (ACK/NACK) or periodic channel state information (CSI) for the cell group on the at least one licensed carrier provided by the cell group; and
      report an aperiodic CSI for the cell group on the one or more unlicensed carriers provided by the cell group.

11. The UE of claim 10, wherein the at least one of the HARQ ACK/NACK or the periodic CSI are reported via the uplink control channel or an uplink shared channel.

12. The UE of claim 10, wherein the at least one of the HARQ ACK/NACK or the periodic CSI are reported only on the at least one licensed carrier provided by the cell group.

13. The UE of claim 10, wherein the aperiodic CSI is reported via an uplink shared channel.

14. A non-transitory computer-readable medium storing computer executable code for a user equipment (UE) for wireless communication in a shared spectrum, comprising code to:
    determine a cell group, the cell group including at least one licensed carrier configured with an uplink control channel and one or more unlicensed carriers;
    report at least one of a hybrid automatic repeat request (HARQ) acknowledgement/negative-acknowledgement (ACK/NACK) or periodic channel state information (CSI) for the cell group on the at least one licensed carrier provided by the cell group; and
    report an aperiodic CSI for the cell group on the one or more unlicensed carriers provided by the cell group.

15. The non-transitory computer-readable medium of claim 14, wherein the at least one of the HARQ ACK/NACK or the periodic CSI are reported via the uplink control channel or an uplink shared channel.

16. The non-transitory computer-readable medium of claim 14, wherein the at least one of the HARQ ACK/NACK or the periodic CSI are reported only on the at least one licensed carrier provided by the cell group.

* * * * *